United States Patent
Miyazaki et al.

(10) Patent No.: US 7,294,270 B2
(45) Date of Patent: *Nov. 13, 2007

(54) METHOD OF TREATING PHOTOGRAPHIC WASTE LIQUID

(75) Inventors: Hideo Miyazaki, Kanagawa (JP); Kazuhiko Matsumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 60 days.

This patent is subject to a terminal disclaimer.

(21) Appl. No.: 10/845,509

(22) Filed: May 14, 2004

(65) Prior Publication Data
US 2004/0226881 A1 Nov. 18, 2004

(30) Foreign Application Priority Data

| May 16, 2003 | (JP) | ............................ P.2003-138922 |
| May 23, 2003 | (JP) | ............................ P.2003-146430 |
| May 23, 2003 | (JP) | ............................ P.2003-146431 |

(51) Int. Cl.
*C02F 3/00* (2006.01)
(52) U.S. Cl. ................. 210/610; 210/631; 210/748
(58) Field of Classification Search ............... 210/610, 210/631, 748, 758
See application file for complete search history.

(56) References Cited

U.S. PATENT DOCUMENTS

| 4,155,810 A | * | 5/1979 | Kitajima et al. ............. 210/620 |
| 5,245,111 A | * | 9/1993 | Betz ............................ 205/752 |
| 5,296,111 A | * | 3/1994 | Suzuki et al. ................ 210/610 |
| 5,534,148 A | | 7/1996 | Suzuki et al. |
| 5,575,915 A | * | 11/1996 | Nakamura et al. .......... 210/631 |
| 5,770,093 A | * | 6/1998 | Shiota et al. ................ 210/762 |
| 5,894,077 A | | 4/1999 | Jones et al. |
| 6,780,306 B2 | | 8/2004 | Schlager et al. |
| 2001/0022290 A1 | * | 9/2001 | Shiota et al. ................ 210/762 |
| 2005/0098498 A1 | * | 5/2005 | Miyazaki et al. ........... 210/631 |

FOREIGN PATENT DOCUMENTS

| DE | 100 15 209 A1 | 10/2001 |
| EP | 0 861 810 A2 | 9/1998 |
| JP | 59-42094 A | 3/1984 |
| JP | 63-116796 A | 5/1988 |
| JP | 3-262594 A | 11/1991 |
| JP | 4-235786 A | 8/1992 |
| JP | 4-244299 A | 9/1992 |
| JP | 5-96298 A | 4/1993 |
| JP | 6-320184 A | 11/1994 |
| JP | 7-47347 A | 2/1995 |
| JP | 7-299467 A | 11/1995 |
| JP | 7-323290 A | 12/1995 |
| JP | 08-281272 | 10/1996 |
| JP | 8-296081 A | 11/1996 |
| JP | 9-234475 A | 9/1997 |

OTHER PUBLICATIONS

Translation of JP 3-262594, Nov. 1991.*
Translation of JP 6-320184, Nov. 1994.*

* cited by examiner

*Primary Examiner*—Christopher Upton
(74) *Attorney, Agent, or Firm*—Sughrue Mion, PLLC

(57) ABSTRACT

A photographic waste liquid treatment method comprises an electrolytic oxidation treatment for photographic waste liquid.

7 Claims, 2 Drawing Sheets

METHOD OF TREATING PHOTOGRAPHIC WASTE LIQUID

FIELD OF THE INVENTION

The present invention relates to a method of treating photographic waste liquid, specifically to a practical and economical treatment method of photographic processing waste liquid hitherto considered to be difficult to treat to an extent meeting the effluent standards of Sewerage Law. In particular, the invention relates to a photographic waste liquid treatment method capable of working in photofinishing laboratories.

BACKGROUND OF THE INVENTION

Liquid wastes discharged in various photographic processing steps are collected generally in a mixed state, and treated as photographic waste liquid. Diversity of the waste liquid composition makes it difficult to find effective methods for waste liquid treatment. So the photographic waste liquid is one of the most difficult-to-treat industrial effluents. Although a number of treatment methods for photographic waste liquid have so far been disclosed, they still have many problems with both removal rate and treatment cost.

As a realistic countermeasure, photographic waste liquid is consigned to persons involved in recovery and disposal of effluent, and incinerated by them. For performing incineration without emitting ecologically deleterious substances into the air and water environments, it is necessary to raise the incineration temperature. However, incineration disposal is difficult to perform by continuous operation of a middle- or small-scale incinerator at high temperatures. So the incineration has to be carried out using a large-scale incinerator and cannot help involving a high disposal cost. In addition, for the purpose of avoiding pipe clogging and wearing away of the incinerator by high melting inorganic salts, such as iron oxides, produced by burning, it is required to provide a chemical iron-removal step. Therefore, the disposal by incinerator has a problem with further complexity of disposal process and operation.

Under these circumstances, the incineration disposal, though a realistic countermeasure, is not a satisfactory countermeasure at present. So studies of more excellent treatment techniques for photographic waste liquid have been made continually.

The methods hitherto disclosed with respect to the treatments for photographic waste liquid are mainly biological, chemical and physical treatments.

As examples of the biological treatment are disclosed many methods of treating photographic waste liquid by use of activated sludge, inclusive of the method for reducing COD of waste liquid from medical X-ray film processing as disclosed in JP-A-59-42094. In these treatment methods, waste liquid diluted generally by a factor of 10 to 50 is treated with activated sludge for a period (an average residence time) of 15 to 50 days. As a result, the waste liquid is said to receive a 50-80% reduction of COD and a 50-80% reduction of BOD by decomposition and removal.

Examples of chemical treatment (oxidation method) include an ozone oxidation method, a hydrogen peroxide oxidation method, oxidation methods using other chemical oxidants, and an electrolytic oxidation method. The ozone oxidation method is disclosed, e.g., in JP-A-7-47347. Although it is an effective method for decomposition and removal of inorganic ingredients as a COD component and decomposition of benzene rings contained in aromatic developing agents, ozone oxidation has a minimal effect on the removal of organic ingredients as a BOD component. As to the method of using hydrogen peroxide, the method of using hydrogen peroxide in combination with a catalyst is disclosed in JP-A-9-234475. In addition, the hydrogen peroxide-ferric salt method (Fenton method), though effective for both inorganic and organic ingredients, is attended with a treatment-cost problem. Further, there are known the method of using persulfate as an oxidant, the method of adding an oxidant to a strong acidic solution and thereby depositing sulfur compounds in a stabilized condition, the method of oxidizing with chlorine and hypochlorite, and the treatment method of heating in the presence of persulfate.

Of those methods, the electrolytic oxidation method has advantages that it ensures easy and safe operations and enables reduction of apparatus size in contrast to oxidation treatment with a strong chemical oxidizing agent, and simple in comparison with biological treatment and physical treatment. The electrolytic oxidation methods are disclosed, e.g., in JP-A-63-116796, JP-A-8-296081 and JP-A-7-323290. In the process of electrolyzing photographic processing waste liquid, however, oxidized species produced upon electrolysis decompose organic substances with efficiency when the organic component concentration is high, but it occurs in many cases that at the time when the organic substances are decomposed into lower fatty acids including acetic acid, formic acid and oxalic acid the efficiency of further decomposition by electrolysis is lowered to result in waste of electric power.

In general, it is said that the COD component removal rate (reduction rate) attained by chemical treatment is of the order of 50%.

Examples of physical treatment include a high-pressure heating method, an atomization burning method and an evaporative drying method. Since a large amount of halide ions are contained in photographic waste liquid, stress corrosion of a reactor becomes a problem. In addition, the heat exchanger used for heat recovery has a problem with disposal of scales, residues and exhaust gases.

Further examples of hitherto proposed physical treatment include an adsorptive removal method using an inorganic or organic high polymer adsorbent, a reverse osmosis method and a dialysis method.

When any of the foregoing methods is used anone, however, it cannot have satisfactory treatment effect upon photographic waste liquid in which a wide variety of chemical substances causing environmental pollution are present. For instance, an problem with the chemical oxidation method (1) is a great cost increase caused by consumption of a large amount of chemical reagents, an problem with the electrolytic oxidation method (2) is a drop in COD reduction rate resulting from fouling of electrodes, an problem with the absorptive removal method (3) is an adsorbent usage increased with decreasing adsorption power, an problem with the evaporation method (4) is an release of an offensive order and toxic substances, an problem with the microbial treatment method (5) is a decrease of microorganisms' ability to treat COD components in the presence of deleterious substances, and an problem with the reverse-osmosis or dialysis method (6) is a short life of column or film.

As improvement measures, combinations of the foregoing methods, especially a combination of oxidation treatment and microbial treatment, have been proposed. For instance, JP-A-3-262594 discloses that both of COD and BOD of photographic waste liquid can be reduced by the combination of hydrogen peroxide oxidation treatment (Fenton method) and microbial treatment, JP-A-4-235786, JP-A-6-

320184 and JP-A-4-244299 disclose the electrolytic treatment-microbial treatment combinations enabling reductions in COD and BOD of photographic waste liquid, and JP-A-5-96298 discloses that the COD and BOD of photographic waste liquid can be reduced by using photochemical oxidation with ozone gas in combination with microbial treatment. However, these combination methods each involve any of such problems that the size of apparatus becomes large and thereby a large space for installation of the apparatus is required, operations become complicated, special microorganisms are required for treatment, and dilution with a large quantity of water is required. Therefore, any of them cannot afford a satisfactory solution.

Of those treatments, the electrolysis method used for treatment of waste liquid features easy and safe operations and reduction in apparatus size, compared with the oxidation treatment using strong chemical oxidants. However, in the process of electrolyzing photographic processing waste liquid, oxidized species produced upon electrolysis decompose organic substances with efficiency when the organic component concentration is high, but it occurs in many cases that at the time when the organic substances are decomposed into lower fatty acids including acetic acid, formic acid and oxalic acid the efficiency of further decomposition by electrolysis is lowered to result in waste of electric power. In the electrolysis of those organic acids, the potential window is still narrow even when platinum and lead electrodes are used, so there is no improvement in electrolysis efficiency. In addition, the use of platinum and lead electrodes causes a trouble of eluting heavy metal ions.

JP-A-7-299467 discloses the electrolytic oxidation method using a positive electrode having a diamond-evaporated surface. Therein, it is shown that such an electrode enables an increase in impressed voltage to result in enhancement of the effect of decomposing organic substances. However, any of the methods mentioned above still falls short of meeting the effluent standards of Sewerage Law.

On the other hand, in view of the composition of photographic waste liquid, biological treatments with aerobic microorganisms have a common inevitable drawback of requiring a large volume of dilution water for their application to photographic waste liquid and consequent upsizing of apparatus. Therefore, these treatments are practicable in large-scale waste-treatment sites where photographic waste liquid is accumulated and treated intensively, preferably together with other liquid wastes, but it is disadvantageous to carry out them in photofinishing laboratories where photographic waste liquid generates because the volume of waste liquid to be treated is increased by water dilution to result in increases of equipment cost, installation space and operation cost. Although the foregoing complex treatment techniques involving biological treatment can raise reduction rates of COD and BOD, they have problems peculiarly their own as mentioned above and disadvantages associated with water dilution, so it is impractical to apply them in photofinishing laboratories.

In contrast, anaerobe treatments can often be applied effectively to liquid wastes having high salt concentrations and high COD. However, anaerobic treatment cannot be applied to photographic waste liquid because the waste liquid has a high sulfur compound content and produces hydrogen sulfide by reduction under an aerobic conditions, thereby making it impossible for microorganisms to survive.

In photo finishing laboratories, as mentioned above, it is difficult to perform not only biological treatment, irrespective of whether it is aerobic or anaerobic, but also complex treatment methods wherein biological treatment is combined with other treatments. So photographic waste liquid is transported from photofinishing laboratories to an outside centralized treatment site to which the treatment thereof is commissioned. Under these circumstances, a waste treatment method which makes it possible for both BOD and COD of photographic waste liquid to be reduced to no higher than drainage standard values and has practicability in photofinishing laboratories also is desired strongly.

As mentioned above, any of the hitherto disclosed waste liquid treatment methods, irrespective of whether they are used in isolation or in combination, falls short of perfectly solving the problems of the hour, and they are difficult to carry out in photofinishing laboratories in particular. Therefore, it is strongly desired to find a method of reducing BOD and COD of photographic waste liquid to a level lower than the effluent standards, especially a photographic waste liquid treatment method which can be carried out in photofinishing laboratories also.

SUMMARY OF THE INVENTION

An object of the present invention is to provide a photographic waste liquid treatment method which can ensure effective reductions of BOD and COD even when the volume of dilution water required at the time of biological treatment of the photographic waste liquid is reduced. And a further object thereof is to enable treatment of photographic processing waste liquid in a photofinishing laboratory, or on-site treatment, by application of the aforesaid photographic waste liquid treatment method.

Another object of the present invention is to provide a photographic waste liquid treatment method enabling effective reduction in COD of photographic waste liquid. More specifically, the invention aims to present an electrolytic oxidation treatment method which enables effective reduction in COD of photographic waste liquid and causes no abnormal drop in COD reduction efficiency. And another object of the invention is to provide a treatment apparatus for practicing such an electrolytic oxidation treatment method.

Another object of the present invention is to provide a photographic waste liquid treatment method which enables effective reductions in BOD and COD of photographic waste liquid, and a further object thereof is to provide a method applicable to photographic waste liquid treatment in photofinishing laboratories, or an on-site treatment method for photographic waste liquid, which can ensure effective reductions in both BOD and COD.

A further object of the invention is to present a method of effectively removing silver from silver-containing photographic waste liquid and recovering the silver with efficiency.

Under our intensive studies pursued while focusing attention particularly on a connection between microorganisms' activities and the composition and salt concentration of photographic waste liquid for the purpose of finding a solution to the foregoing problems, it has come to discover a special composition condition for maintaining activities of microorganisms even when the photographic waste liquid to be treated has a high salt concentration, thereby achieving the invention. That is, the following is a first embodiment of the invention.

1. A method of treating photographic waste liquid, comprising: adjusting photographic waste liquid so as to have a COD/ammoniacal nitrogen ratio of 3 or below; performing a physicochemical oxidation treatment to the adjusted photographic waste liquid; and then performing a biological treatment to the treated photographic waste liquid.

2. The method of treating photographic waste liquid as described in the item 1, wherein the photographic waste liquid having been subjected to the physicochemical oxidation treatment is subjected to the biological treatment directly or in a state of water dilution having a dilution factor of 1 to 4, wherein the dilution factor is defined as a ratio of (volume of waste liquid after dilution with water) to (volume of undiluted waste liquid).

3. The method of treating photographic waste liquid as described in the item 1 or 2, wherein the photographic waste liquid is further adjusted so as to have a sulfur content of 5 g/L to 20 g/L.

4. The method of treating photographic waste liquid as described in any one of the items 1 to 3, wherein the physicochemical oxidation treatment of the photographic waste liquid is an electrolytic oxidation treatment.

5. The method of treating photographic waste liquid as described in any one of the items 1 to 4, wherein the biological treatment is an activated-sludge treatment.

6. The method of treating photographic waste liquid as described in any one of the items 1 to 5, wherein the biological treatment is a treatment with microorganisms immobilized in a carrier.

7. The method of treating photographic waste liquid as described in any one of the items 1 to 6, wherein the photographic waste liquid is color photographic waste liquid.

8. The method of treating photographic waste liquid as described in any one of the items 1 to 7, wherein the photographic waste liquid contains a hardly biodegradable compound.

Also, in the process of tracking down the cause of a COD reduction rate drop greater than that commensurate with the decrease of the liquid waste component contributory to COD for the purpose of finding a solution to the aforementioned problem, we just happened to carry out electrolysis of photographic waste liquid while removing precipitates produced from the waste liquid during the electrolytic oxidation and discovered that neither inner wall of the electrolytic cell nor the electrode surfaces were fouled, and what is more, the abnormal drop in COD reduction rate was resolved to our surprise and the electrolysis was proceeding at a rate commensurate with the residual content of the component contributory to COD.

The invention has been made on the basis of this discovery, and the following is a second embodiment of the invention.

9. A method of electrolytic oxidation treatment for photographic waste liquid, wherein the electrolytic oxidation treatment is carried out while removing precipitates produced during the electrolytic oxidation treatment.

10. An apparatus for an electrolytic oxidation treatment to photographic waste liquid, comprising a means for removing precipitates produced from the photographic waste liquid by the electrolytic oxidation treatment.

11. The apparatus for an electrolytic oxidation treatment to photographic waste liquid as described in the item 10, wherein the means for removing the precipitates is a filtering device.

12. The apparatus for an electrolytic oxidation treatment to photographic waste liquid as described in the item 10, wherein the means for removing the precipitates is a sedimentation tank.

13. The apparatus for an electrolytic oxidation treatment to photographic waste liquid as described in any one of the items 10 to 12, which comprises a conductive diamond electrode as a positive electrode.

14. A method of recovering silver from photographic waste liquid, comprising: preforming an electrolytic oxidation treatment to photographic processing waste liquid; separating precipitates produced during the electrolytic oxidation treatment from the waste liquid; and recovering silver contained in the precipitates.

Under our intensive research into potential materials for electrodes used in electrolytic methods relatively easier and safer in operations than chemical methods and the potential of the combination of electrolysis method and biological treatment, which has been made with the intention of finding a solution to the foregoing problems, it has come to discover that the photographic waste liquid electrolyzed to a certain extent by means of a diamond electrode became free of hard-to-biodegrade substances, such as EDTA, through electrolytic decomposition and the TOC (Total Organic Carbon) content therein was rapidly reduced by biological treatment with activated sludge, thereby achieving the invention. That is, the following is a third embodiment of the invention.

15. A method of treating photographic waste liquid, comprising: performing an electrolytic oxidation treatment to photographic waste liquid, in which a conductive diamond electrode is used as a positive electrode; and then performing a biological treatment to the treated photographic waste liquid.

16. The method of treating photographic waste liquid as described in the item 15, wherein the biological treatment is preformed after a 70% or greater reduction in COD of photographic processing waste liquid is achieved by the electrolytic oxidation treatment.

17. The method of treating photographic waste liquid as described in the item 15 or 16, wherein in the electrolytic oxidation treatment, a conductive diamond electrode is used as both positive electrode and negative electrode.

18. The method of treating photographic waste liquid as described in the item 17, wherein a polarity inversion in the positive electrode and the negative electrode is performed in the electrolytic oxidation treatment.

19. The method of treating photographic waste liquid as described in any one of the items 15 to 18, wherein the biological treatment is activated-sludge treatment.

20. The method of treating photographic waste liquid as described in any one of the items 15 to 19, wherein the biological treatment is a treatment with high salt concentration resistance bacteria.

21. The method of treating photographic waste liquid as described in any one of the items 15 to 20, wherein the biological treatment is a treatment with microorganisms immobilized by a carrier.

DESCRIPTION OF REFERENCE NUMERALS AND SIGNS

Figure 1:
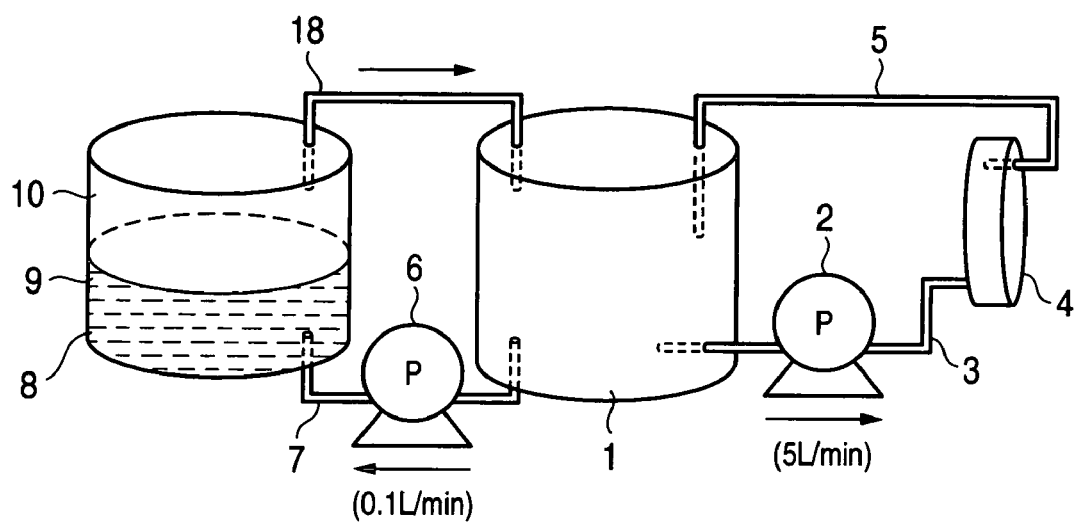
FIG. 1 is a schematic diagram showing an embodiment of the present sedimentation tank-equipped electrolytic oxidation apparatus for photographic waste liquid.

1. Waste liquid tank
2. Feed pump
3. Feed pipe
4. Electrolytic cell
5. Return pipe
6. Feed pump
7. Feed pipe
8. Sedimentation tank
9. Precipitate
10. Supernatant layer
11. Positive electrode
12. Negative electrode
13, 14. Disk-form outer flames
15. Annular spacer
16, 17. Openings for passage of liquor
18. Return pipe
21. Waste liquid tank
24. Electrolytic cell
25, 28. Return pipes
26. Filtering device
27. Outlet
31. Waste liquid tank
34. Electrolytic cell
37. Feed pipe
39, 40. Precipitates
41, 42. Supernatant layers
43, 44. Sedimentation tanks
46. Return pipe The important point in the present treatment method of photographic waste liquid in the first embodiment of the present invention is to begin by adjusting photographic waste liquid to undergo treatment so as to have a COD/ammoniacal nitrogen ratio (hereinafter abbreviated as "a COD/N ratio") of 3 or below in advance of biological treatment of the photographic waste liquid, and then to give physicochemical oxidation treatment to the photographic waste liquid. And our finding consists in that the waste liquid having received physicochemical oxidation treatment after the COD/N ratio adjustment to a value within the foregoing range has little ill effect on activities of microorganisms (biodegradable microorganisms) in spite of its high salt concentration. Therefore, it becomes possible in the invention to carry out biological treatment at a dilution rate of no greater than 4 or directly without dilution, although general cases require a dilution rate of at least 10, frequently of the order of 50, for attaining salt concentrations enabling biological treatment. Thus, the volume of apparatus for biological treatment can be reduced epochally, and waste liquid treatment in small- to medium-sized photofinishing laboratories also (on-site treatment of waste liquid) becomes practicable. Although the mechanism for producing such an effect remains uncertain, one possible mechanism is thought to be as follows: When ammoniacal nitrogen is present in a large amount, organic acids produced by physicochemical oxidation are converted into ammonium salts having less influences on living things than alkali metal salts; as a result, dilution for the subsequent biological treatment can get off by using only a limited volume of water. In other words, this unexpected effect is supposed to be produced by carrying out physicochemical oxidation in the specified range of COD/N ratios. However, the present method should not be construed as excluding usual cases wherein water dilution for biological treatment is performed at high level of dilution factors.

Moreover, the present photographic waste liquid treatment method in the first embodiment can achieve its best effect when applied to waste liquid having a sulfur content adjusted to the range of 5 g/L to 20 g/L. Although it is the actual situation that photographic waste liquid contains an abundance of both sulfur and sulfur-containing compounds derived from sulfites and thiosulfates present in photographic processing solutions and the effect of biological treatment is marred by those sulfur and sulfur-containing compounds when the biological treatment is carried out in combination with chemical oxidation treatment, the invention sees no sign of such a detrimental effect, but efficient proceeding of biodegradation. Although the mechanism thereof is also unclear, it is probable that ammoniacal nitrogen present in a high concentration forms salts by reacting with oxidative products, inclusive of sulfuric acid ion, from physicochemical oxidation of sulfur compounds and thereby the oxidative products are rendered harmless to microorganisms.

The invention is described below in further detail.

Hereinafter, microorganisms involved in biodegradation are sometimes referred to as "microorganisms", but these two terms may be construed as having the same meaning. Additionally, "photographic processing waste liquid" is synonymous with "photographic waste liquid" as an abbreviated expression for the former.

In the second embodiment of the present invention, as described above, a feature of the present method of electrolytic oxidation treatment for photographic waste liquid consists in the adoption of a simple measure of performing electrolytic oxidation treatment of photographic waste liquid while removing the precipitates produced during the treatment. By taking this measure can be achieved not only the effect of preventing the electrolytic cell and the electrodes from becoming fouled, which is expected as a matter of course, but also the unexpected effect of improving the decomposition rate of photographic waste liquid (COD or TOC removal rate) to the level meeting the effluent standards of Sewerage Law.

As a result of enabling the photographic waste liquid treatment by electrolytic oxidation alone, a small space will suffice for the treatment and the on-site waste liquid treatment can also be performed in photofinishing laboratories.

Incidentally, the COD and BOD values are adopted for oxygen-consuming organic substances in effluent from a law-regulation viewpoint. With respect to photographic waste liquid, on the other hand, COD and TOC have substantially the same meaning from the standpoint of effluent standards. Since the TOC measurement is easy because of its simplicity, the specification hereinafter has some descriptions using TOC in place of COD. Even when either value is adopted, there is no difference in technological substance to the present objects.

In the third embodiment, as is clear from the above descriptions, the feature of the present photographic waste liquid treatment method is that a diamond electrode is used in electrolytic oxidation treatment for photographic waste liquid. The use of a conductive diamond electrode enables effective decomposition of hard-to-biodegrade ingredients in photographic waste liquid, such as EDTA and PEG, without attended by deterioration in electrolysis efficiency due to fouling of the electrode; as a result, biodegradation in biological treatment after the electrolysis proceeds with ease to bring about considerable reductions in BOD and COD, and by extension to make it possible to meet the effluent standard. This excellent effect is thought to come about for a reason that the potential window of oxidation at the positive electrode is wide due to a high hydrogen over voltage of the diamond electrode and hydroxyl radicals as an effective oxidant species are produced with efficiency. Moreover, unlike heavy metal electrodes, the diamond electrode placed in waste liquid under treatment causes neither contamination with metals eluted from the positive electrode nor deactivation of activated sludge by silver ions in the photographic waste liquid because of almost complete precipitation of silver ions as silver sulfide. On the other hand, known zinc oxide, tin oxide and platinum electrodes cannot achieve such a high electrolysis efficiency as the diamond electrode can deliver, and they entail contamination of the treated waste liquid by elution from the positive electrode.

A defect of traditional biological treatment with activated sludge, namely insufficient biodegradation the photographic waste liquid undergoes through such a treatment, is obviated by carrying out electrolytic oxidation utilizing a diamond electrode as pretreatment. As a result, an excellent method of treating photographic waste liquid by utilizing advantages of biological treatment, namely treatment under ordinary temperature and pressure, with no chemical reagent and at a low energy cost, can be realized. A further advantage of this method is in that the biological treatment of electrolytically oxidized waste liquid can be effected in a diluted state by a relatively low dilution factor (of the order of 1 to 5) in spite of a high concentration of salts in the waste liquid. Accordingly, the space for treatment is not required to be large, and on-site waste liquid treatment can be carried out in photofinishing laboratories also. This advantage can be fully achieved by use of salt-resistant microorganisms.

DETAILED DESCRIPTION OF THE INVENTION

The invention is illustrated below in more detail.

<Composition and Water-Quality Characteristics of Photographic Waste Liquid (Photographic Processing Waste Liquid)>

Prior to explanations of modes for carrying out the invention, photographic processing waste liquid as a target of the invention is described. The photographic processing waste liquid includes not only liquid wastes from developments for color photographs and monochromatic photographs but also liquid waste from fixation and a wide variety of liquid wastes generated in photographic industry including photolithography. As to the liquid waste from fixation, the residual liquid remaining after recovery of dissolved silver from fixation waste liquid is a subject of the present treatment. In general, liquid wastes from various photographic processing steps are recovered in a mixed state, and treated.

The liquid wastes from development, which are components making up photographic waste liquid, are liquid wastes discharged in various steps of development, so they contain ingredients eluted from photosensitive materials during the development-processing, such as gelatin and sensitizing dyes, products of reactions taking place during the development-processing and constituent chemicals remaining without being consumed although they are included in developer formulae (hereinafter described in detail).

Therefore, the liquid waste from development is composed almost exclusively of a developing agent and its oxidation products, alkali compounds and buffering agents, preservatives selected from sulfites or hydroxylamine derivatives, and alkali halides. The liquid waste from fixation contains as main component ammonium thiosulfate, sodium thiosulfate, and/or ammonium sulfite, and/or sodium sulfite, and alkali halides. The liquid waste from bleaching contains as main components a bleaching agent, such as polyaminopolycarboxylic acid-Fe(III) complex salt and reaction products derived from the bleaching agent, alkali halides (re-halogenation agents), and buffer salts. The main components of liquid waste from bleach-fix are almost the same components as the liquid wastes from fixation and bleach-fix contain mainly. And the liquid wastes discharged in various other processes contain functional ingredients of their respective process solutions and compounds derived from such ingredients. Accordingly, the composition of photographic waste liquid to be treated is a mixture of ingredients of developer origin, ingredients of bleaching solution origin, fixing solution origin and/or bleach-fix solution origin, components eluted from photosensitive materials and products of reactions taking place during the photographic processing. More specifically, the mixture includes a wide variety of chemical ingredients, such as buffering agents (e.g., carbonates, phosphates, borates, tetraborates, hydroxybenzoates), color developing agents, sulfites, hydroxylamine salts, carbonates, water softeners, alkylene glycols, benzyl alcohols, surfactants (e.g., alkylphosphonic acids, arylphosphonic acids, aliphatic carboxylic acids, aromatic carboxylic acids), oxidizing agents (e.g., EDTA complex salt of Fe(III), 1,3-diamino-propanetetraacetic acid complex salt of Fe(III)), halides (e.g., alkali bromides, ammonium bromide), thiosulfates (e.g., sodium thiosulfate, ammonium thiosulfate), and acetates. This diversity makes it difficult to find an effective method for liquid waste treatment.

Although the photographic waste liquid is considerably various in composition depending on the kinds of processing steps pertinent thereto and the mixing proportion of liquid wastes discharged in the processing steps respectively, the approximate COD thereof is in the range of 30,000 mg/l to 50,000 mg/l, the approximate BOD thereof is in the range of 5,000 mg/l to 15,000 mg/l, the approximate TOC (Total Organic Carbon) is in the range of 10,000 mg/l to 25,000 mg/l, the approximate Kjeldahl nitrogen is in the range of 10,000 mg/l to 15,000 mg/l, and the approximate total phosphorus is in the range of 100 mg/l to 500 mg/l. The ratio of COD to BOD to TOC is of the order of 4:1:1.5 and characterized by high COD proportions. And the relative proportion of three elements, namely carbon, nitrogen and phosphorus, is of the order of 100:100:1 and characterized by the high nitrogen content.

The treatment of photographic waste liquid with a biological treatment means alone is difficult because the photographic waste liquid is high in content of a hardly biodegradable compound. The main hardly biodegradable compound is bleaching agents such as Fe(III) chelates as recited above and developing agents.

The first embodiment of the present invention is explained below in detail.

[Waste Liquid Treatment Process]

<Preparation of Photographic Waste Liquid>

In the present method of photographic waste liquid treatment, the photographic waste liquid to be treated undergoes adjustment of its COD/N ratio in the first place.

The COD of photographic waste liquid is determined in the usual way and equivalent to CODMn defined by JIS K0102 (Testing Method of Industrial Effluent). On the other hand, the ammoniacal nitrogen is ammoniacal nitrogen provided in Sewerage Law and determined by the testing method based on JIS. In the case of photographic waste liquid, however, it is possible to obtain a very close approximation of the ammoniacal nitrogen content in the waste liquid by calculating the total nitrogen content in compounds capable of producing ammoniacal nitrogen from both the numerical values in formulae of processing solutions used for photographic processing and the proportion of the processing solutions used. So this approximation calculation method may be adopted as a practical method.

In calculation of the approximation, compounds targeted for the calculation as origins of ammoniacal nitrogen contained in the photographic waste liquid include developer-originated color developing agents and hydroxylamine derivatives, and bleaching solution-, fixing solution- and bleach-fix solution-originated ammonium salts, such as ammonium thiosulfate, ammonium aminopolycarboxylates, ammonium aminopolycarbonatoferrate(III), ammonium halides and ammonium sulfite, and alkanolamines. In addition to these compounds, other ammonium salts and amine compounds become subjects of the calculation if they are contained in the formulae of those processing solutions. Further, if ammonium salts and amine compounds are contained in the formulae of processing solutions other than the foregoing ones, they are also included in subjects of the calculation.

The photographic waste liquid is discharged from various processing baths including a developing bath, a bleaching bath, a fixing bath, a bleach-fix bath and a stabilizing bath. In each bath, the contents of ingredients are held nearly constant. Therefore, the composition of waste liquid discharged is usually invariant. Of those baths, the fixing bath and the bleach-fix bath are high in ammonium thiosulfate content. On the other hand, the developing bath hardly contains ammonium salts or origins of ammoniacal nitrogen but, if it contains any of them, the content thereof is very low. Therefore, it is appropriate from a practical point of view that adjustment of the COD/N ratio of photographic waste liquid to 3 or below suitable for the invention is made by mixing the waste liquid from a fixing bath or a bleach-fix bath with the waste liquid from other processing baths with consideration given to the CODs of the waste liquid from the other processing baths on a basis of the ammonium salt content in the waste liquid from the fixing bath or the bleach-fix bath.

Adjustment of the COD/N ratio to 3 or below is achieved by changing variously the mixing proportion of liquid wastes discharged in various steps of photographic processing. When there is a liquid waste from a redundant step, separate treatment may be adopted, or it is also possible to adopt a method of adding ammonium hydroxide so as to adjust the COD/N ratio of the mixture of total liquid wastes from all the steps to 3 or below.

Additionally, a case where the proportion of liquid wastes discharged in the targeted steps of photographic processing already ensures a composition having a COD/N ratio of 3 or below suitable for the invention is also included in the present case of "adjusting a COD/N ratio to 3 or below" as far as there is an intention for performing the subsequent physicochemical treatment.

The suitable COD/N ration is 2.5 or below, preferably 2 or below.

In addition to the adjustment of the COD/N ratio to 3 or below, it is preferable to adjust the sulfur content to the range of 5 g/L to 20 g/L. By this adjustment, biodegradation activity is increased and thereby the decomposition rate is raised. This activity increase is thought to be due to the formation of sulfates having little influence on the growth of microorganisms.

The sulfur content (hereinafter abbreviated as the S content in some cases) refers to the total amount of sulfur element contained in sulfur containing-compounds and sulfur (produced in a very small amount by decomposition of sulfur-containing compounds, if any) in the waste liquid. The sulfur-containing compounds include sulfites, thiosulfates and sulfur element-containing organic ingredients in processing solutions as recited above. According to a practical calculation method, the sulfur content can be determined approximately from the numerical values of sulfites and thiosulfates in formulae of processing solutions and the proportion of the processing solutions used.

The suitable sulfur content is from 6 g/L to 18 g/L, preferably from 7 g/L to 16 g/L.

Adjustment of the S content can be made from the same viewpoint as that of the COD/N ratio. Specifically, shortage of an S content can be covered by heightening the proportion of liquid waste from fixing bath or bleach-fix bath at the time of mixing liquid wastes from processing solutions, or by adding ammonia sources, such as ammonium sulfate. When the S content is no lower than 20 g/L, on the other hand, the proportion of the liquid waste from fixing bath or bleach-fix bath is lowered or sulfur is removed from the waste liquid after precipitation by the passage of time, thereby achieving the adjustment.

<Physicochemical Oxidation Treatment>

The photographic waste liquid adjusted in the foregoing manner is subjected to physicochemical oxidation treatment.

The term "physicochemical oxidation treatment" as used herein refers to the chemical oxidation treatment of the type which uses an oxidizing agent not leaving any reaction product other than water, oxygen, hydrogen, carbon dioxide gas or carbonate ion in the treated waste liquid. More specifically, the physicochemical oxidation treatment includes oxidation treatment with an oxidizing agent selected from oxygen, ozone, hydrogen peroxide or percarbonic acid, actinic (e.g., ultraviolet) irradiation treatment in the presence of an oxidizing agent as recited above, electrolytic oxidation treatment, and electrolytic oxidation treatment accompanied by actinic irradiation.

Of those physicochemical oxidation treatments, electrolytic oxidation treatment, ozone oxidation treatment, hydrogen peroxide oxidation treatment and combinations of these treatments with ultraviolet irradiation are preferred over the others. In particular, electrolytic oxidation treatment and the combination of ozone treatment and ultraviolet irradiation are advantageous.

The electrolytic oxidation treatment is mentioned below.

In general, much halide ions are present in photographic waste liquid. Therefore, chloride ions are oxidized by electrolysis at a positive electrode to form chlorine molecules, and part of the chlorine molecules further react with water to produce hypochlorous acid ions; as a result, oxidation activity is increased. So the electrolytic oxidation treatment is advantageously applied to achieving the present purpose, but on the other hand, it requires the electrolysis tank to be made of an anti-corrosive material capable of resisting high corrosiveness of ingredients in an electrolytic solution, such as platinum, ferrite, stainless steel or iron capable of quickly forming oxide film. A negative electrode does not participate directly in electrolytic oxidation reaction, but it is preferably made of a material inert to the reaction solution, such as platinum or stainless steel. For instance, it is preferable to use a ferrite electrode as positive electrode and a stainless steel electrode as negative electrode. Further, since the reaction solution contains a large quantity of suspended component, it is advantageous to use a rotating negative electrode from the viewpoint of preventing deposition of the suspended component onto the electrode and uniformly causing oxidation reaction to raise current efficiency.

The suitable temperature for electrolytic oxidation treatment is room temperature or a temperature a little higher than room temperature, the suitable voltage is from 5.0 V to 8.0 V, and the suitable current density is from 0.005 A/cm$^2$ to 1 A/cm$^2$, preferably from 0.01 A/cm$^2$ to 0.5 A/cm$^2$. And the electrolysis may be performed according to a batch method or a continuous method.

Depending on the degree of electrolytic oxidation treatment, this process performed under suitable conditions can delivers a 10-40% reduction, mostly a 10-20% reduction, in COD of the waste liquid. However, the big advantage of electrolytic oxidation treatment, which surpasses the COD reduction effect of this treatment, is in that the waste liquid after the electrolytic oxidation treatment obtains improvement in rate of biodegradation by microorganisms. In reality, the analytical result obtained shows that most of compounds having almost no biodegradability, such as ingredients as developing agent, EDTA and Fe$^{+3}$-EDTA complex salt, are decomposed into biodegradable substances by the electrolytic treatment. When the microorganisms immobilized by a carrier are used, biodegradation treatment proceeds more effectively.

The electrolytic oxidation treatment involved in the present waste liquid treatment method can enhance its effect by the use of a high-speed agitation electrolytic oxidation treatment apparatus. It is advantageous for he high-speed agitation electrolytic oxidation treatment apparatus applied to the invention to have an agitation device equipped with a vibrating plate and adopt a treatment method in which the electrolytic oxidation is performed while agitating an electrolyte by vibration of the vibrating plate. And very high electrolytic oxidation speed and great COD reduction effect can be attained by properly choosing a vibration frequency.

As an example of an agitation device suitable for the invention, there is a device operating in a mode that a vibrating plate is coupled to a motor, the rotation of the motor is transformed into vibration of the vibrating plate, and the agitation action of the electrolyte is caused by the vibration. The vibration frequency of the vibrating plate is from 10 cycles/sec to 100 cycles/sec, preferably from 15 cycles/sec to 80 cycles/sec, far preferably from 20 cycles/sec to 60 cycles/sec.

The suitable agitation device has at least one vibrating plate, preferably a plurality of vibrating plates in alignment with one another. When a plurality of vibrating plates are provided for the agitation device, their alignment may preferably be in a configuration that the vibrating plate surfaces are aligned in the same plane, a multiple-stack configuration that the vibrating plates are stacked on tope of each other in the direction perpendicular to their surfaces so that their surfaces are in parallel with each other, or a slant multiple-stack configuration that the vibrating plates are stacked on tope of each other so that their surfaces are oriented so as to slant off from the stacking direction although they are in parallel with each other. In any of these configurations, the vibrating plates are aligned with fixed spacing so as to ensure a liquid flow between each pair of vibrating plates. The suitable spacing is from 1 to 200 mm, preferably from 2 to 150 mm, far preferably from 3 to 100 mm.

The shape of each vibrating plate may be any of a rectangle, an ellipse, a trapezoid, a square, or a rectangle or square whose edges are each rounded off. Of these shapes, a rectangle and a rectangle whose edges are each rounded off are preferred over the others. The size of each vibrating plate can be chosen properly depending on the size of an electrolytic oxidation cell used. As a guide, the per-side area of each vibrating plate is from $\frac{1}{1000}$ to $\frac{1}{5}$, preferably from $\frac{1}{50}$ to $\frac{1}{5}$, of the cross sectional area of an electrolytic cell used. The thickness of each vibrating plate is from $\frac{1}{100}$ to $\frac{1}{5}$, preferably from $\frac{1}{10}$ to $\frac{1}{20}$, of the major edge (major axis) when the vibrating plate is a metal plate, while it is from $\frac{1}{50}$ to $\frac{1}{5}$, preferably from $\frac{1}{20}$ to $\frac{1}{10}$, of the major edge (major axis) when the vibrating plate is a resin plate.

Ozone aeration treatment is mentioned below.

Ozone oxidation is carried out by injecting air containing ozone, which is introduced from an ozonizer (an ozone generator), into photographic waste liquid. Simultaneously with the injection of ozone-containing air, it is preferable to carry out ultraviolet irradiation treatment. In one example of a mode of the injection, waste liquid to be treated is introduced into a vessel capable of passing ultraviolet light with efficiency and aerated with ozone passed through a glass ball filter (pore diameter: 40 to 50 μm) placed in the bottom of the vessel.

For generating ozone, the method of utilizing silent discharge, corona discharge or electrolytic reaction has so far been adopted. Any of these methods may be applied to an ozone generator used in the invention without any particular restrictions. So the ozone generator used in the invention can be chosen from commercially available ones. However, it is preferred by the invention to adopt a method of utilizing silent discharge. The silent discharge refers to the discharge phenomenon occurring in a gap between two electrodes when a high alternating voltage is placed between the electrodes via a dielectric, and part of air in the gap is converted into ozone at the time of discharge. The dielectric used generally is glass, and the spacing of the gap is several mm. The usable voltage therein is from several thousands volts up to, in some cases, twenty thousands volts at AC of 50 to 500 cycles.

There are an ozone generator equipped with a group of planer electrodes facing each other, and an ozone generator having ozone generation tubes placed vertically or horizontally. In the invention, either ozone generator can be used. And both oxygen and air can be used as ozone source, but air is used preferably in the invention because of its cheapness.

Ultraviolet irradiation simultaneous with ozone feeding enables activation of ozone to raise oxidation efficiency. And the ultraviolet light is emitted from a light source, such as a mercury lamp, put in the bottom, interior or exterior of the vessel. The mercury lamp is classified as low-pressure, high-pressure or ultrahigh-pressure, depending on the mercury vapor pressure inside the lamp. The low-pressure mercury lamp has emission lines in the far ultraviolet region, the high-pressure one has emission lines in the near ultraviolet region, and the ultrahigh-pressure one has continuous emission spectrum in the ultraviolet region. Since ozone gas has a broad excitation wavelength region, any type of mercury lamp can be used for the present purpose. The amount of electric power for the lamp varies depending on the COD value of waste liquid treated and decomposability of ingredients in the waste liquid. As a guide, however, it can be set within the range of 5 WHr to 600 WHr, particularly from 20 WHr to 500 WHr, per 100 kg of waste liquid.

The suitable decomposition by ozone gas oxidation, though the degree thereof is chosen properly depending on the composition and concentration of waste liquid, is of the order of a 10-40% reduction, or a 10-20% reduction in many cases, in COD of waste liquid as in the case of electrolytic oxidation. The ozone gas oxidation treatment has the same advantage as the electrolytic oxidation treatment. Specifically, the direct reduction of COD by ozone gas oxidation is a secondary effect, and its primary advantage is in that the waste liquid after the ozone gas oxidation treatment becomes liable to be degraded by microorganisms and has an improved rate of biodegradation by microorganisms.

The treatment with ozone and ultraviolet light is described, e.g., in *Mize Shori Gijutu* (Water Treatment Technology), Vol. 32, No. 1, p. 3 (1991); *Kogyo Yosui* (Industrial Water), No. 349, p. 5 (1987); and *ACS Symposium Ser.* (*Am. Chem. Soc.*), No. 259, p. 195 (1984).

<Biological Treatment>

Dilution of Waste Liquid:

The waste liquid having undergone the physicochemical oxidation treatment, though can be subjected directly to biological treatment in some cases, is preferably diluted by a factor of no greater than 4 prior to biological treatment. The suitable dilution factor is 3 or below, preferably 2 or below. Additionally, it is appropriate that the dilution be carried out after the physicochemical oxidation treatment, but it is possible to perform the physicochemical oxidation treatment after dilution.

At any rate, biodegradation generally requires for photographic waste liquid to be diluted by a factor of the order of 10 to 50, because this dilution enables the waste liquid to secure an environment in which microorganisms can survive and perform activities, especially an environment low in concentration of salts. In accordance with the present method, however, biological treatment can proceed effectively even in waste liquid of low dilution and reduce COD for the reason described above.

The explanation of the first embodiment of the present invention other than the above explanation is the same one as in the second or thrid embodiment of the present invention below.

The second embodiment of the present invention is explained below in detail.

The electrolytic oxidation treatment performed for photographic processing waste liquid in accordance with the present method is described below.

<Preparation of Waste Liquid>

In the invention, the photographic processing waste liquid may be subjected to electrolytic treatment without adjustment of pH and addition of a supporting electrolyte. However, if needed, pH adjustment using alkali agents, such as sodium hydroxide, potassium hydroxide, calcium hydroxide and sodium carbonate, may be carried out before or during the electrolytic oxidation treatment. This pH adjustment can prevent evolution of halogen gases, because bromide, chloride and iodide ions in ingredients of waste liquid to be treated are oxidized to evolve halogen gases respectively when the waste liquid becomes acidic during the electrolysis. In addition, pH in an alkaline range is suitable for decomposition efficiency relating to COD. The alkali agents added maybe in a state of solid, aqueous solution or suspension. The alkali agents may be added prior to electrolytic oxidation treatment, or the electrolysis may be proceeding in synchronization with an automatic pH regulator. Specifically, it is appropriate that the pH adjustment be carried out so as to keep pH 7 or higher, preferably pH 8 or higher, during the electrolytic operations.

For inhibiting precipitates from generating by hydrolysis of iron complex compounds, on the other hand, it is appropriate that the pH be not higher than 12.5.

<Positive Electrode>

In the invention, any of positive electrodes made of known electrode materials having high oxidation potentials, such as platinum, carbon (notably graphite) and lead oxide, can be used as far as electrolytic oxidation is performed while removing precipitates produced. However, it is preferable that conductive diamond be used as a positive electrode material. By use of such a positive electrode, electrolysis of biodegradation-resistant substances in waste liquid can be performed with higher efficiency.

In the invention, it is also preferable to use a conductive diamond electrode as a negative electrode. When electrolysis is carried out using a stainless steel electrode as a negative electrode, scale adheres to the negative electrode and thereby the tank voltage is increased and the passage of electric current through the tank becomes impossible in the end. Therefore, periodic removal of scale is required. With the invention of preventing scale adhesion, devices for reversing the polarity of an electrode in a very short time (JP-A-3-109988, JP-A-5-4087 and JP-A-6-63558) have been reported. Since the inversion of the polarity of a negative electrode, or positive polarization of the hydroxides-attached electrode surface, by use of the foregoing devices makes it possible to re-dissolve calcium and magnesium hydroxides produced and deposited on the surface of the negative electrode in an electrolytic cell into the treated water in the form of calcium and magnesium ions, it is possible to pursue electrolysis reactions while removing the scale from the electrode surface. The use of diamond electrodes as both negative electrode and positive electrode for performing electrochemical treatment of water to be treated, though mentioned above, is advantageous, because adhesion of scale to the electrodes can be inhibited to a satisfactory extent by reverse voltage application as in the cases of the devices cited above.

<Removal of Precipitates>

For removal of precipitates, it is preferable to use a sedimentation tank or a filtering device.

FIG. 1 is a schematic diagram showing an embodiment of sedimentation tank-equipped electrolytic oxidation apparatus usable in the invention. As a matter of course, another embodiment of apparatus may be used. In the embodiment shown in FIG. 1, a spent processing solution, or waste liquid, discharged from a processing machine is stored in a waste liquid tank 1. The waste liquid stored is fed into an electrolytic cell 4 via a liquor-feed pipe 3 by use of a liquor-feed pump 2, and electrolytic oxidation is carried out in the electrolytic cell. The waste liquid containing precipitates produced by electrolytic oxidation in a dispersed state is returned to the waste liquid tank 1 via a return pipe 5, and the spent solution from the processing machine and the waste liquid having received electrolytic oxidation are stored in a mixed state inside the waste liquid tank.

On the other hand, the waste liquid mixed and stored in the waste liquid tank is fed into a sedimentation tank 8 via a liquor-feed pipe 7 by use of a liquor-feed pump 6, and the sedimentation takes place in the sedimentation tank 8, resulting in separation into precipitates 9 and a supernatant layer 10. The precipitates 9 are taken out via an outlet not shown in FIG. 1, and forwarded to a silver recovering system. The supernatant layer 10 is returned to the waste liquid tank 1 via a return pipe 18. In the foregoing way, the electrolytic oxidation circulating system including the waste liquid tank 1 and the electrolytic cell 4 and the sedimentation circulating system including the waste liquid tank 1 and the sedimentation tank 8 are formed, and both reduction of TOC and removal of precipitates (including silver contained therein) are proceeding as the spent solution in the waste liquid tank 1 undergoes a repeat of the forced circulation through both systems. The instant when the indicated electric potential in the electrolytic cell 4 reaches to a specified value, or the instant when the electric current value in the electrolytic cell under low-potential electrolysis reaches to a specified value, or the instant when the electrolytic oxidation time reached to a time set in advance is chosen as an electrolysis end point, and the waste liquid having received electrolytic oxidation until the electrolysis end point comes is discharged from the electrolytic cell 4.

The sedimentation tank may be a tank usually used for activated-sludge treatment of effluent. As to the flow of waste liquid in the sedimentation tank, a flow with a speed enabling the liquor returned from the sedimentation tank to undergo sufficient liquor exchange in the waste liquid tank is good enough, so a too-high-velocity flow is undesirable because the sedimentation becomes insufficient. As to the velocity of circulation between the electrolytic cell and the waste liquid tank, on the other hand, the higher the better. This is because the liquor exchange (agitation) at the electrode surface is an enhancing factor of electrolysis efficiency. As an example, a velocity relation between the electrolytic oxidation circulating system and the sedimentation circulating system is figured as 5 L/min and 0.1 L/min in FIG. 1. However, a proper proportion may be chosen as the velocity relation depending on the size of the apparatus used.

The practice mode of sedimentation method is not limited to a batch mode shown in FIG. 1, but can be also chosen from the mode of continuous operation using the electrolytic cell and the sedimentation tank placed in series, the mode of placing two or more sedimentation tanks in series, or the mode of placing two or more sedimentation tanks in parallel.

In addition, it is also possible to adopt a mode of using centrifugal sedimentation to separate precipitates in a short time by use of a small-volume device.

Figure 3:
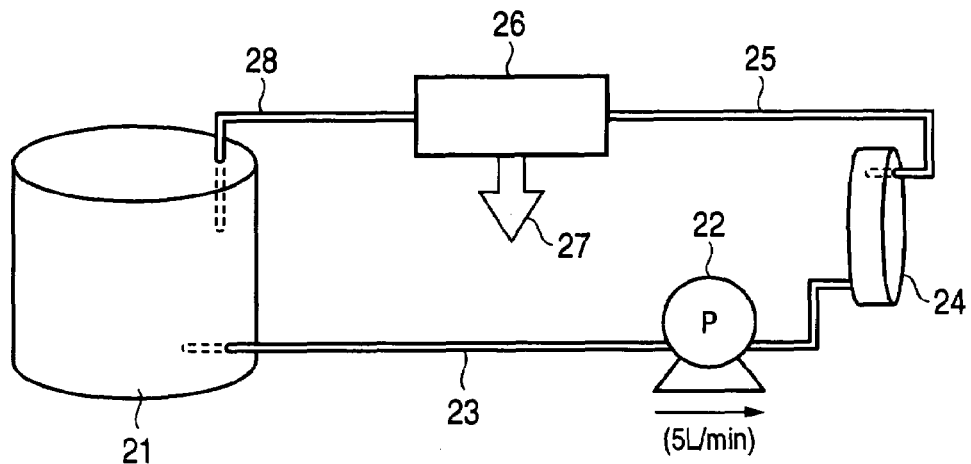
FIG. 3 is a schematic diagram showing an embodiment of the filter tank-equipped electrolytic oxidation apparatus for photographic waste liquid, which is used in Example.

When a filtering device is used for separation and removal of the precipitates, the basic structure of the apparatus differs only in a device for separation and removal of the precipitates and other constituent devices are substantially the same as in the case of adopting the sedimentation method. So such an apparatus is not explained herein, but a mode of operating the apparatus is described in Example (FIG. 3).

As a filter mounted in a filtering device, UF film, RO film, a porous polymer single film filter, a ceramic single film filter and a pulp fiber filter are usable. And any of these filters may be used as far as they have a pore size of 0.05 to 50 µm, preferably 0.1 to 30 µm, far preferably 0.2 to 10 µm.

Examples of such a filter include single-film filters of porous polymers, such as polyvinyl chloride, polyethylene, polypropylene, polybutylene, polysulfone and polyacrylonitrile, porous glass, biscuit plate, igneous rock plate, single-film filters of ceramics, such as foaming nitrides, filter paper and fiber filters of 0.01-denier fibers (nylon, polypropylene, polyethylene). And examples of commercially available products of those filters include various Yumicron films produced by YUASA CO., LTD., Millipore filters made by Millipore Corporation (Millipores AA, DAQ, HA, PH, GS, FG, UC, UM, US. GU and HP), high-precision filters produced by Kuraray Co., Ltd. (SF-301, SF-101 and SF-401) and GORE-TEX film produced by GORE-TEX INC.

Any of filtering methods can be used in the invention as far as precipitates can be collected sufficiently with a filter film in a comparatively short time. And it is appropriate that filtration be performed in an enclosed space under the pressure of 0.1 to 0.8 kg/cm$^2$. As a filtering method utilizing the aforesaid filtering device, one-time mode of once passing liquor through a filtering device will suffice. In some cases, however, a mode of multi-stage one-time passage or one- or multi-stage circulation may be adopted. The shape and size of a filter film usable in the invention can be chosen properly depending on the intended purposes. However, it is preferable to adopt a mode of using a bag-form filter film, flowing the liquor to be treated into the bag from the outside and discharging the liquor from the inside of the bag.

The separation and removal of precipitates may be carried out using a method of installing a sedimentation tank and removing the precipitates from the tank. As to the flow of waste liquid in the sedimentation tank, a flow with a speed enabling sufficient liquor exchange between the sedimentation tank and the waste liquid tank is good enough, so a too-high-velocity flow is undesirable because the sedimentation becomes insufficient. As to the velocity of circulation between the electrolytic cell and the waste liquid tank, on the other hand, the higher the better. This is because the liquor exchange (agitation) at the electrolytic cell surface is a factor of electrolysis efficiency. Specifically, the tanks having the foregoing structures can be thought.

Additionally, although the photographic waste liquid can be treated to a level permitting discharge into sewers in accordance with the present photographic waste liquid treatment method wherein electrolytic oxidation is carried out while removing precipitates, biological treatment may further be carried out after the electrolytic oxidation treatment, if needed. When the electrolytic oxidation treatment is accompanied with biological treatment, the treatment load thereof can be lightened. The biological treatment combined with the electrolytic oxidation treatment may be any of known ones, with examples including usual activated-sludge treatment, biological treatments with salt-resistant bacteria such as marine microorganisms, and the microorganism treatment used in JP-A-320184.

The explanation of the second embodiment of the present invention other than the above explanation is the same one as in the firdt or thrid embodiment of the present invention below.

The third embodiment of the present invention is explained below in detail.

[Electrolytic Oxidation Treatment]

The electrolytic oxidation treatment performed for photographic processing waste liquid in accordance with the present method is described below.

<Preparation of Waste Liquid>

In the invention, the photographic processing waste liquid may be subjected to electrolytic treatment without adjustment of pH and addition of a supporting electrolyte. However, if needed, pH adjustment using alkali agents, such as sodium hydroxide, potassium hydroxide, calcium hydroxide and sodium carbonate, may be carried out before or during the electrolytic oxidation treatment. This pH adjustment can prevent evolution of halogen gases, because bromide, chloride and iodide ions in ingredients of waste liquid to be treated are oxidized to evolve their respective halogen gases when the waste liquid becomes acidic during the electrolysis. In addition, pH in an alkaline range is suitable for decomposition efficiency relating to COD. The alkali agents added maybe in a state of solid, aqueous solution or suspension. The alkali agents may be added prior to electrolytic oxidation treatment, or the electrolysis may be proceeding in synchronization with an automatic pH regulator. Specifically, it is appropriate that the pH adjustment be carried out so as to keep pH 7 or higher, preferably pH 8 or higher, during the electrolytic operations.

For inhibiting precipitates from generating by hydrolysis of iron complex compounds, on the other hand, it is appropriate that the pH be not higher than 12.5.

<Positive Electrode>

The invention features using conductive diamond as an electrode material for a positive electrode. Owing to the use of conductive diamond, electrolysis of hard-to-biodegrade substances in waste liquid can be performed with efficiency.

The term "conductive diamond electrode" as used in the invention refers to the diamond electrode having an electrical resistivity lower than 1 MΩcm, but the word "conductive" is sometimes omitted from the term so far as there is no fear of misunderstanding.

The diamond as the present electrode material may be formed into an electrode by coating diamond powder on the surface of a substrate, such as a tablet, a punched plate, a wire net, a powder-sintered product or a metallic fiber-sintered product of titanium, niobium, tantalum, silicon, carbon, nickel or tungsten carbide, in accordance with a method as described hereinafter, or tabular diamond maybe used as an electrode without undergoing any working. However, the former electrode is preferable in terms of cost. And the diamond coating in the former electrode is described as the diamond layer. For the purpose of securing adherence and protecting the substrate, it is appropriate to provide an interlayer between the diamond layer and the substrate. As a material of the interlayer, carbide or oxide of the metal as a constituent of the substrate can be used. The substrate surface may be polished or roughened instead with the intention of contributing to increases in adherence and reaction area. In addition to diamond, the electrode material may include small amounts of other electrode materials. The substrate functions also as a current collector of diamond. When tabular diamond is used as an electrode, therefore, it is required to prepare another current collector and feed a current to the diamond electrode via the current collector.

As methods for formation of a diamond layer on a substrate surface, a hot-filament CVD method, a microwave plasma CVD method, a plasma arc jet method and a PVD method have been developed.

The hot-filament CVD method as a representative of these methods is explained below.

An organic compound as a carbon source, such as alcohol, is held in a reductive atmosphere, such as the atmosphere of hydrogen gas, and maintained at a carbon radical-producing temperature ranging from 1,800° C. to 2,400° C. During this process, an electrode substrate is placed in a region of a different temperature (750-950° C.) at which diamond separates out. The suitable organic compound gas concentration in the hydrogen gas atmosphere is from 0.1 to 10% by volume, the suitable feed speed of the organic compound is from 0.01 to 10 liter/min though it depends on the size of a reaction vessel used, and the pressure is from 15 to 760 mmHg. The present diamond layer is formed under those conditions by evaporating a layer of fine diamond grains, the sizes of which are generally in the range of about 0.01 μm to about 5 μm, onto the substrate until the layer has a thickness of 0.1 to 50 μm, preferably 1 to 10 μm. This thickness range is suitable for protecting the substrate against intrusion of an electrolytic solution. For imparting favorable conductivity to the diamond layer formed, it is required to dope the diamond layer with an element different in valence. For instance, phosphorus or boron is doped into the diamond layer in a quantity of 1 to 100,000 ppm, preferably 100 to 10,000 ppm. As a source of such a dopant, boron oxide and diphosphorus pentaoxide, which are low in toxicity, are suitable.

To the doping for imparting sufficient conductivity, it is preferable to apply a plasma-enhanced CVD (PECVD) diamond evaporation method. Details of methods for formation of doped electrodes are described, e.g., in Ramesham, *Thin Solid Films*, vol. 229, pp. 45-50 (1993). The PECVD diamond layer is a boron-doped polycrystalline diamond produced from a mixture of microwave plasma-activated methane and hydrogen gas. Evaporation of a diamond layer according to that method is well understood by persons skilled in the art (See, e.g., Klages, Appl. Phys., vol. A58, pp. 513-526 (1993).

The diamond layer produced by hot-filament CVD (HFCVD) method is available from Advanced Technology Materials, Inc., 7 Commerce Drive, Danbury, Conn. 06810, U.S.A.

As a method for production of a diamond electrode, the method of performing chemical evaporation in a vacuum chamber as disclosed in JP-A-8-225395, paragraph 0007, is also suitable.

<Negative Electrode>

Although any material may be used as a negative electrode as far as it has a sufficient current-carrying capacity and corrosion resistance high enough not to be corroded during the electrolysis stoppage, a stainless steel plate or rod is particularly suitable as a negative electrode used in the invention. However, other electrodes, such as a carbon electrode and other metal electrodes, can also be used. The configuration of electrodes can be chosen properly from a negative electrode-positive electrode pair, a sandwich structure formed of two positive electrode and one negative electrode placed between them, or a structure formed of alternating negative and positive electrodes aligned in a stacked form. The shape of a negative electrode may be any of wire, rod and tabular shapes.

In an embodiment of the present invention, the conductive diamond electrode as mentioned above can be used as a negative electrode also. When both negative and positive electrodes are conductive diamond electrodes, it is preferable to perform electrolysis while reversing the polarity of each electrode from the viewpoint of maintaining the electrodes in a normal condition. This is because the electrolytic cell gives rise to scale, or hydroxides of calcium and magnesium ions which adhere to the negative electrode surface, so periodic removal of scale is required. With the intention of preventing scale adhesion, devices for reversing the polarity of an electrode in a very short time (JP-A-3-109988, JP-A-5-4087 and JP-A-6-63558) have been reported. Since the inversion of the electrode polarity, or positive polarization of the hydroxides-attached negative electrode surface, by use of the foregoing devices makes it possible to re-dissolve the hydroxides deposited on the surface of the negative electrode in an electrolytic cell into the treated water in the form of calcium and magnesium ions, it is possible to pursue electrolysis reactions while removing the scale from the electrode surface. No particular restrictions as to the interval and duration of the inversion are required so far as both the electrodes have the same shape.

One of the most important properties of a conductive diamond electrode material is electric conductivity. If the conductivity of a diamond electrode is insufficient, the voltage required for pursuing the intended electrolysis becomes too high, so it becomes impossible to perform the electrolysis from an economical point of view. The diamond electrode before doping has a great band gap (5.5 eV) because of the absence of dopants as impurities, and it is rather close to an insulator. As in the description of the positive electrode, the conductivity of synthetic diamond grains and the diamond layer can be adjusted properly by taking in a dopant, such as brone, as an impurity at an appropriate level. The species of a dopant used for imparting conductivity to diamond is not limited to boron, but other elements as disclosed in U.S. Pat. No. 5,162,886, including lithium, beryllium, nitrogen, phosphorus, sulfur, chlorine, arsenic and selenium, may also be taken in. Of the doping treatments with these elements, boron doping is preferred over the others because it can create a resistivity lower than 20 MΩcm. The suitable boron concentration in doped diamond is generally from 100 ppm to 10,000 ppm.

The gross resistance of an electrode assembly depends on not only electrical contact resistance arising from contact between its constituents, resistance of the substrate and interface resistance between the substrate and the diamond layer, but also the thickness of each constituent. As a result, the electrode resistance of a diamond layer origin can be adjusted in part by changing both conductivity and thickness of the diamond layer. The diamond layer thickness suitable for reaching to the intended resistance is from 0.1 µm to 1 mm, particularly preferably from 1 to 100 µm. When the diamond layer is too thin, it cannot cover the substrate to a sufficient extent, so there is a possibility that the effective surface area of the electrode is reduced. When the diamond layer is too thick, on the other hand, the resistivity of the diamond layer causes a voltage drop in the thickness direction, and the electric power is lost through resistance heating in the electrode. In the extreme case, the thick diamond layer becomes hot with use, and thereby the binding force between the diamond layer and the substrate is impaired to result in release of the diamond layer from the substrate.

The functions of the substrate are to provide a path for easy passage of electric current through the electrode assembly and to be a mechanical support of a thin diamond layer. It is most important for the conductive substrate to have three properties as mentioned below. In the first place, since the electric conductivity of the substrate is essential for making up a useful electrode, the electrode is designed so as to have an appropriate resistance. For instance, when the resistance of a substrate in the thickness direction ranges from 1,000 to 10,000 Ω, it can be used for low-current purpose as far as the resistance of the electrode assembly as a whole is also in the range of 1,000 to 10,000 Ω. However, it is not desirable that the electrode assembly has such a high resistance value, but the suitable resistance of the electrode assembly is lower than 1,000 Ω, preferably lower than 10 Ω, particularly preferably lower than 1 Ω. The optimal thickness and resistivity conditions of the substrate, though depend on the mechanical strength of a substrate material used, are to be in the range of 0.5 mm to 10 cm and in the range of 0.1 to 20 Ωcm, respectively.

The conduction characteristic between the substrate and the diamond layer relates closely to the property of the interface between them, and it has an influence also upon the interface formation as a result of the process of making the doped diamond adhere to the substrate. The observation of the interface between the thin diamond layer formed by a hot-filament evaporation method and the silicon substrate under a high-resolution electron microscope demonstrates that the interface is complicated in aspect (Jiang, N et al., Appl. Phys. Lett., 1993, vol. 63, No. 3, page. 328). This literature to Jiang et al. suggests that an amorphous carbon layer or a crystalline SiC layer is necessary for forming diamond nuclei. The presence of this layer ensures good electrical contact between the substrate and the diamond layer. The interface layer joins the substrate and the diamond layer together and creates good binding between the substrate and the diamond layer.

More specifically, the substance forming the interface can create good electrical contact because of its conductive property or very little thickness of the interface formed, and the interface is formed so as not to generate resistance causing any problem.

Metals forming carbides capable of holding steady conductivity can be used as substrate materials suitable for diamond evaporation. These materials form carbides meeting requirements for the interface adherence and the electric contact. Examples of such materials include lower-order oxides of Mo, W, Ti, Cu, Co, Cr, Ni and Ti (or suboxides as disclosed in U.S. Pat. No. 4,912,286). However, the substrates suitably used in the invention are not limited to those metals. For instance, p-type doped Si is a generally used substrate material. Such an Si substrate has a resistivity of the order of 0.01-0.1 Ωcm. Substrate materials used to advantage are materials having satisfactory adherence to diamond via a stably conducting interface between them and high electric conductivity, most suitably those further having electrochemical inertness or the capability of forming passive-state film to protect the contact areas of the substrate with the liquor to be treated. Examples of a metallic material satisfying such requirements include Ti, Ta, Zr and Nb. Of these metals, metal titanium is particularly superior, because the metal substrate made of titanium undergoes no significant corrosion during the contact with an electrolytic solution and does not suffer failures occurring from the contact with electrolytes under electrochemical treatment.

For effective progress of electrolysis by feed of electric current into an electrode assembly with efficiency, it is required that the electric connection from a power supply to a conductive substrate be in a good condition. In order to meet this requirement, the powder supply, specifically a current control unit or a voltage control unit such as a potential adjustable cell, has to be designed so as to secure good electric contact with the conductive substrate. The good electric contact may be secured by use of a binding material capable of providing appropriate electric contact, such as conductive epoxy resin including silver epoxy resin (which can attach firmly wires or other conductive materials to the substrate), or by application of pressure to both electrode assembly and conductive material to keep them in direct physical contact with each other. Herein, it is particularly preferred to use an electrode assembly formed using a substrate which is not corroded with any electrolyte solution and attached firmly to a diamond layer, and that, designed so as to function also as a conducting material to the power source.

The voltage drop occurring in the conductive diamond electrode during passage of electric current depends on the resistivity and thickness of the diamond layer, the resistivity and thickness of the substrate, and the resistance coming from connection to the electrode. Therefore, it is preferable to design the electric conductivity of the substrate and the binding conditions of the substrate to the diamond layer and the power supply so that the voltage drops caused thereby are negligible small compared with the total voltage drop occurring in the electrode assembly.

The current density at the time of electrolytic oxidation is generally of the order of 10 mA/cm$^2$, and the voltage drop in the electrode is from 10 to 100 V. So, the power consumption as the product of a current value and the square of a resistance value is very high, and considerable energy is lost through resistance heating. However, when the diamond layer has a resistivity lower than 1 M$\Omega$cm, the electrode provided with such a diamond layer can be used as an electrode for electrolysis, provided that the substrate used has sufficiently high electric conductivity and the diamond layer has a sufficiently little thickness (less than 5 μm).

Specifically, the suitable electrode is an electrode provided with a diamond layer having a resistivity lower than 100 $\Omega$cm and a thickness ensuring a voltage drop smaller than 1 V at the electric current density of 100 mA/cm$^2$. When electrodes can meet such conditions, they can work with an appropriate current density in a state that the power loss due to resistance heating is slight. The most suitable electrodes are those having resistivity values lower than 0.1 $\Omega$cm and thickness values enabling the electrodes to have voltage drops smaller than 0.1 V at the current density of 1 A/cm$^2$.

<Structure of Electrolytic Cell>

As to the structure of an electrolytic cell, those having known various configurations can be adopted in the invention also. Specifically, the cell used in the invention may be a single-chamber cell or a cell partitioned into a positive electrode chamber and a negative electrode chamber with a membrane. The simplest practical mode for electrolysis is a mode of using a single-chamber cell. In the single-chamber cell, there is no barrier by which the positive and negative electrodes are separated. So there is no restraint on the migration of solutes between positive and negative electrodes. In such a single-chamber mode, there is a general risk that ingredients oxidized at the positive electrode are reduced afterwards at the negative electrode. In the invention, however, there is no possibility of such a risk. This is because fission of C—H and C—C bonds and formation of C—O and OH bonds constitute most of electrolytic oxidation reactions of the ingredients in photographic waste liquid, and the oxidation the ingredients undergo in these electrolytic reactions is virtually irreversible.

In a double-chamber cell, a conducting diaphragm, such as an ion-exchange membrane, a microfilter membrane, a semipermeable membrane or a porous membrane, is inserted between positive and negative electrodes. Such a diaphragm allows passage of some types of ion species alone from anolyte into catholyte, or vice versa. The function of a diaphragm is to avoid mixing between anolyte and catholyte and keep electrical neutrality. Further, the use of a proper membrane makes it possible to control the character of ions passing through the membrane and migrating. For instance, the use of such a double-chamber cell enables a preferred embodiment of the invention wherein sulfur ions produced by reduction of thiosulfate ion and sulfite ion in a negative electrode chamber are converted into silver sulfide precipitate and collected in the negative electrode chamber.

However, since the durability of a membrane used therein is limited, the double-chamber cell requires a proper management, such as membrane exchange, for prevention of fouling.

According to the foregoing descriptions of single-chamber and double-chamber cells, the use of a single-chamber cell is preferable from the viewpoint of simplicity. However, in cases where it is feasible to manage the membrane properly and control the process, the mode of using a double-chamber cell is advantageous.

In the present electrolytic oxidation, any of a batch system, a re-circulating system and a continuous system may be adopted. From these systems, the most suitable one can be chosen depending on the scale and extent of waste liquid treatment.

The change in the surface area of a diamond electrode can be attained by controlling surface roughness of the diamond layer so as to impart fine roughness to the diamond layer surface even when the electrode surface is geometrically the same from the macroscopic point of view. More specifically, the electrode can have a different surface area by changing the evaporation method and parameters and evaporating a diamond layer different in grain size. When the electrode surface is not smooth but considerably rough, the geometrical area measured under a microscope is greater than the apparent surface area of the electrode, and the electric current density becomes lower than the apparent electric current density. Since the rough electrode surface brings about nonuniform current density throughout the electrode, the conditions are more complicated as a matter of fact. The rough electrode surface has peaks and valleys, and the current density is highest in the neighborhood of each peak and lowest in the neighborhood of each valley. The acute tips on the surface have the maximum current density. As a result, certain parts on the electrode surface work under current density higher than the calculated current density, while other parts work under current density lower than the calculated one.

A high-surface-area electrode, though has ununiformity as mentioned above, can provide more electrode faces on which reaction can occur. So it is advantageous for an electrode to have a rough surface. A polycrystalline diamond layer is by nature rough at its surface; as a result, it can provide excellent surface-area properties in point of volumetric efficiency of an electrochemical reaction. In addition to the surface area of an electrode, current density variations coming from the design of an electrochemical cell has to be taken into account. The electric current flows between a positive electrode and a negative electrode, so it is appropriate that the electrodes be set in positions capable of securing the most uniform current density distribution. In an electrochemical cell containing diamond layer-equipped electrodes, the positive electrode and the negative electrode are placed so as to keep the smallest possible electrode spacing without forming direct connection between them or any path causing a short. Although the electrode spacing greater than several centimeters is allowable, the suitable spacing is within the range of 0.1 mm to 50 mm, especially preferably 0.5 mm to 20 mm.

In the present electrolytic oxidation of photographic waste liquid, the suitable electric current density is from 1 mA/cm$^2$ to 10 A/cm$^2$, and the suitable flow rate-to-cell volume ratio is from 0.001 to 1,000. And the suitable electrode surface area is equivalent to or greater than the geometrical electrode surface area measured with a microscope, especially 1-5 times greater than the geometrical electrode surface area. In further preferred conditions, the electric current density is from 20 mA/cm$^2$ to 2 A/cm$^2$, and the flow rate-to-cell volume ratio is from 0.01 to 50. In the best mode of the invention, the electric current density is from 50 mA/cm$^2$ to 800 mA/cm$^2$, the flow rate-to-cell volume ratio is from 1 to 20, and the electrode surface area is at least twice greater than the geometrical electrode surface area measured with a microscope.

[Biological Treatment]

In the invention, the photographic waste liquid is electrolyzed with a diamond positive electrode-equipped electrolytic cell, and further subjected to biological treatment. The biological treatment is illustrated below.

<Dilution of Waste Liquid>

The waste liquid having received the electrolytic oxidation treatment is diluted so as to have a concentration suitable for the growth of microorganisms.

The suitable dilution factor is 100 or below. In a case where the biological treatment is carried out in a dedicated waste-treatment facility other than a photofinishing laboratory, the photographic waste liquid is diluted by a factor of 5 to 100, preferably by a factor of 5 to 50, and then subjected to biological treatment. On the other hand, in a case where the biological treatment is carried out in a photofinishing laboratory, the photographic waste liquid, though sometimes can undergo direct biological treatment without any dilution, is preferably diluted by a factor of 4 or below prior to biological treatment. Therein, the suitable dilution factor is 3 or below, preferably 2 or below. Incidentally, it is preferable to carry out the dilution after electrolytic oxidation treatment, but it is also possible to carry out electrolytic oxidation treatment after dilution.

In either case, biodegradation of photographic waste liquid generally requires that the photographic waste liquid be diluted by a factor of 10 to 100. In accordance with the invention, however, biological treatment can progress efficiently even in waste liquid having a low dilution factor to achieve a COD reduction as in the above case of on-site treatment.

The dilution factor as used herein refers to the (after-dilution volume of a solution to be treated)/(volume of an undiluted solution to be treated) ratio.

<pH Adjustment of Waste Liquid>

The waste liquid having received electrolytic oxidation treatment is adjusted to a pH value suitable for the growth of microorganisms by addition of an acid or an alkali. The pH suitable for the growth of microorganisms, though depends on the species of the microorganisms, is generally from 5.0 to 9.0, preferably from 6.5 to 7.5.

The pH may be adjusted before the waste liquid is brought into contact with microorganisms, or after the electrolyzed liquor is added to a biological treatment tank. When the pH varies during the biological treatment, it is preferable to pursue the treatment in synchronization with an automatic pH regulator.

<Mode of Biological Treatment>

As a method of biological treatment, known aerobic biological treatment of general-purpose use can be adopted. Specifically, not only a general activated-sludge method, but also a method of mixing aerobic microorganisms in an untreated solution while aerating or exposing them to air or oxygen, such as a lagoon method, a sprinkled filter bed method or a rotating disk method, can be applied to the biological treatment in the invention. For carrying out waste liquid treatment in a photofinishing laboratory, it is preferable to use a compact bioreactor including an aeration tank provided with a waste-liquor inflow system, an activated-sludge separation and return system, and a treated waste liquid discharge system. These biological treatment methods are described more specifically in W. W. Eckenfelder & D. L. Ford, *Waste Water Treatment Process, Designing Theory and Experimental Method*, translated by Saburo Matsui, published by Gihodo Shuppan Co., Ltd.; and *Seibutugakuteki Mizushori Gijutu to Sochi* (which may be translated literally "Biological Water Treatment Technology and Apparatus"), compiled by Kagaku Kogaku Kyokai, published by Baifukan Co., Ltd.

The biological treatment method particularly preferred in the invention is a treatment method carried out in a mode that microorganisms are carried and immobilized by a carrier. Of immobilized treatments, an encompassed treatment is preferred. The carried and immobilized treatment is favorable for on-site treatment in particular since it can heighten a microorganism concentration and prevent a leak of microorganisms; as a result, the treatment capability of a treatment tank per volume can be enhanced.

Method of Carrying and Immobilizing Microorganisms:

The preparation of microorganism-immobilized carrier used in the invention has no particular restriction as to the manner and the mode, provided that biodegrading microorganisms are immobilized so as not to leak out from a carrier. Examples of a known method of carrying and immobilizing microorganisms include an accretive biofilm method using a carrier enabling microorganisms to accrete thereto and form biofilm thereon, a carrier culture method of preparing a mixture of a carrier and a culture medium and cultivating microorganisms in the mixture, a carrier binding method of binding microorganisms to a water-insoluble carrier, a method of confining microorganisms within pores of a carrier under reduced pressure, a method of immobilizing microorganisms by forming cross-linkages among microorganisms by use of a reagent having two or more functional groups, an encompassed immobilization method of trapping microorganisms inside a high polymer gel or film, and carrier bonding methods classified by bonding mode as a covalent-bond method, a physical adsorption method, an ionic-bond method or a biologically specific bond method. Of these methods, the accretive biofilm method and the encompassed immobilization method, especially the encompassed immobilization method, are used to advantage.

A feature of the accretive biofilm method is that microorganisms can be highly concentrated to result in enhancement of treatment efficiency. In addition, this method enables slowly growing microorganisms, which are generally washed away from a treatment system, to be held inside the system. Further, this method features retention of a state in which microorganisms can live stably.

To mention features of the encompassed immobilization method, this method can achieve high treatment efficiency because it enables retention of microorganisms in high concentrations, can immobilize slowly growing microorganisms, and can provide not only large tolerances to changes in conditions including pH and ambient temperature but also durability to withstand high-load conditions. The encompassed immobilization method used in the invention has no particular restriction as to the kind of a carrier material, provided that the carrier material can encompass microorganisms and keep the activities of microorganisms in the encompassed state and, what is more, has high physical strength and can withstand a long-term use. Examples of such a method include an acrylamide method, an agar-acrylamide method, a PVA-boric acid method, a PVA-freeze method, a photo-curing resin method, an synthetic acrylic resin method, a sodium polyacrylate method, a sodium alginate method and a κ-carrageenan method.

Preparation of microorganism-immobilized gel in the case of an acrylamide method as a representative of encompassed immobilization methods is described below. The immobilized gel is prepared by suspending microorganisms (condensed microorganisms whose MLSS is of the order of 20,000 ppm) in an acrylamide monomer solution containing a cross-linking agent (e.g., N,N'-methylenebisacrylamide), adding thereto a polymerization accelerator (e.g., N,N,N', N'-tetramethylethylenediamine) and a polymerization initiator (e.g., potassium persulfate), pouring the resultant solution into a mold such as a polyvinyl chloride tube having a diameter of 3 mm, running polymerization at 20° C., extruding the polymerized matter from the mold, and cutting it to the definite length. The pores at the surface of the gel thus prepared are smaller than the microorganisms, so the microorganisms encompassed in the gel and immobilized are resistant to leaks, and grow inside the gel to undergo autolysis. Thus, only the contaminants in the waste liquid penetrate into the gel through the pores and treated with the inside microorganisms.

More detailed descriptions of these immobilization methods are described, e.g., in a book entitled "Seibutsu Shokubai tositeno Biseibutsu (which may be translated literally "Microorganisms as Biocatalysts"), p. 100, written by Saburo Fukui, published by Kyoritsu Shuppan Co., Ltd. (1979); a book entitled "Biseibuutu Koteikaho niyoru Haisui Shori" (which may be translated literally "Effluent Treatment by Microorganism Immobilization Method"), written by Ryuichi Sudo, published by Sangyou Yosui Chosakai; a paper entitled "Seibutsumaku-Ho niyoru Haisuishori no Kodo, Koritsuka no Doko" (which may be translated literally "Trends toward Sophistication and High Efficiency in Effluent Treatment by Biofilm Method") written by Yuhei Inamori, published in *Suishitsu Odaku Kenkyu*, Vol. 13, No. 9, pp. 563-574 (1990); and a paper entitled "Kodo Mizushori Gijutsu Kaihatsu no Doko, Kadai, Tenbo" (which may be translated literally "Trends, Problems and Views concerning Development of Advanced Water Treatment Technology"), written by Yuhei Inamori, published in *Yosui to Haisui*, Vol. 34, No. 10, pp. 829-835 (1992).

Carrier for Holding Microorganisms:

Next, carriers usable for holding microorganisms are described.

Any of materials known as carriers for holding microorganisms can be used as far as they can ensure retention of microorganisms' activities, have high physical strength and withstand a long-term use. From the viewpoint of effective holding of useful microorganisms, however, it is preferable to use a carrier having surfaces to which microorganisms adsorb firmly, a porous carrier having high holding power owing to its micropores into which microorganisms can invade, or a carrier made up of fine particles forming an aggregation to secure an increased adsorption or occlusion area.

Although swelling carrier materials are favorable materials from a viewpoint that they can offer great available space to microorganisms, they are lacking in physical strength essential to a long-term steady use after holding and immobilization of microorganisms. On the other hand, non-swelling carrier materials are preferable in terms of physical strength. In addition, as mentioned hereinafter, their available space can secure by taking advantage of size effect and shape effect.

In a microbial treatment condition that liquor to be treated and a carrier are in vigorous relative motion, the physical strength of the carrier is of particular importance. In a fluidized bed case where a carrier is made to flow as in an activated-sludge tank, the specific gravity control is required, and the specific gravity is adjusted to about 1.1 by use of a specific gravity controlling agent, such as silica. In this respect also, it is preferable that the carrier has great physical strength.

Examples of a carrier material preferred in the invention for the reasons mentioned above include polysaccharides, such as cellulose, dextran and agarose; inactivated proteins, such as collagen, gelatin and albumin; ion-exchange resins; synthetic macromolecular compounds such as polyvinyl chloride; inorganic substances such as ceramics and porous glass; natural hydrocarbons, such as agar, alginic acid and carrageenan. In addition, cellulose acetate, polyacrylamide, polyvinyl alcohol, epoxy resin, light curing resins, polyester, polystyrene and polyurethane are also included therein. Further, natural materials, such as lignin, starch, chitin, chitosan, filter paper and wood chips, can be utilized.

Of these materials, synthetic high polymers of polyolefin series, notably polypropylene and polyethylene, are preferred as materials best matching the foregoing conditions.

Such materials are commercially available, with examples including Biostage (made of polypropylene, a product of Tsutsunaka Plastic Industry Co., Ltd.) and Xebio Biotube (made of polyethylene, a product of Xebio Plast Co., Ltd.).

Examples of a shape suitable for a carrier include a shape close to a sphere, a shape close to a cube, a shape close to a rectangular solid, a shape of a cylinder and a shape of a tube. Of these shapes, a shape close to a sphere is preferred owing to ease of preparation, while a shape close to a rectangular solid and a shape of a tube are preferred because of their large specific areas. These carriers can be prepared using any of known methods. Examples of a method usable herein include a method of dropping a solution containing microorganisms and a carrier material (or a precursor thereof) into an insoluble liquid and solidifying drops in the liquid, thereby preparing a dispersion of microorganism-held carrier particles; a method of solidifying a solution containing microorganisms and a carrier material (or a precursor thereof) by lowering the temperature or adding thereto a gelling agent or a solidifying agent and then cutting the gelled matter into particles of an appropriate size, thereby preparing microorganism-held particles having a shape of rectangular solid; and a method of injecting a solution containing microorganisms and a carrier material (or a precursor thereof) into an insoluble liquid from extrusion nozzles and solidifying the solution in the liquid to prepare microorganism-held string-shaped solidified matter, and further cutting the matter properly into cylindrical particles, wherein annular (tube-shaped) microorganism-held carrier particles are prepared when the dies of the extrusion nozzles have a ring form.

The size (outer diameter) of carrier particles is from 0.1 to 70 mm, preferably from 0.5 to 40 mm, far preferably from 1.0 to 10 mm. When the particle size is great, the specific surface area becomes small and the efficiency is lowered. On the other hand, when the particle size is small, the particles decompose and disappear quickly, so they are next to useless as carriers. Therefore, the particle size is chosen suitably depending on the target carrier.

Microorganisms:

Microorganisms used in biological treatment carried out in a general mode where the microorganisms are not immobilized are substantially the same as those used in biological treatment carried out with a compact apparatus utilizing immobilized microorganisms. Therefore, the microorganisms are explained below without regard to the mode in which they are used.

In accordance with the present method, photographic waste liquid generally hard to biodegrade can be treated with usual activated sludge. And it doesn't matter what history and origin the microorganisms in activated sludge have, because acclimation treatment is carried out. As mentioned above, however, photographic waste liquid contains complexing agents of aminopolycarboxylic acid type, various anionic and nonionic surfactants and organic solvents, so special microorganisms capable of biodegrading those ingredients with efficiency, respectively, can be used alone or in combination with activated sludge. In the latter case, it is appropriate that a plurality of microbial treatment tanks be used so that treatments with specific microorganism-activated sludge combinations are carried out in separate treatment tanks and sufficient action of each of ingredient-specific microorganisms is secured.

Further, since the photographic waste liquid is high in salt concentrations, it is preferable that the microorganisms used are aerobic bacteria capable of growing in high salt concentration conditions. In the case of on-site treatment in photofinishing laboratories, it is advantageous to lower a dilution factor of waste liquid to be treated and thereby reduce in size of apparatus. In this respect also, salt-resistant microorganisms (halotorelant microorganisms) are used to advantage. Examples of salt-resistant microorganisms include the high salt concentration-resistant White-rot Fungi disclosed in JP-A-2001-169775, notably marine White-rot Fungi, the salt-resistant bacteria (halotorelant bacteria) disclosed in JP-A-2000-270846 and JP-A-2000-279167, and the salt-resistant nitrification/denitrification bacteria disclosed in JP-A-9-192690 and JP-A-9-201187.

Examples of still other microorganisms having the ability to decompose EDTA include marine bacteria such as *Bacillus editabidus* and *Mesophilobacter editabidus*. This *Bacillus editabidus* as a bacterium capable of decomposing organic aminocarboxylic acids is the strain in which *Bacillus editabidus*-M1 (FERM P-148-68) and *Bacillus editabidus*-M2 (FERM P-14869) are included. And *Mesophilobacter editabidus* as another bacterium capable of decomposing organic amino carboxylic acids is the strain in which *Mesophilobacter editabidus*-M3 (FERM P-14870) is included.

Also, examples of microorganisms decomposing aromatic hydrocarbon compounds (e.g., phenols), organic solvents (e.g., toluene, trichloroethylene) and organic chlorinated compounds (e.g., dioxin, PCB), which can be used in the invention as those specified above, include not only microbes of the *Pseudomonas* genus, but also microorganisms classified in the genera *Methylosinus, Methylomonas, Methylobacterium, Hethylocystis, Alcaligenes, Mycobacterium, Nitrosomonas, Xanthomonas, Spirillum, Vibrio*, bacterium, *Achromobacter, Acinetobacter, Flavobacterium, Chromobacterium, Desulfovibrio, Desulfotomaculum, Micrococcus, Sarcina, Bacillus, Streptomyces, Nocardia, Corynebacterium, Psedobacterium, Arthrobacter, Brevibacterium, Saccaromyces* and *Lactobacillus*, respectively.

Examples of microorganisms having the ability to decompose metal chelating agents such as EDTA and their chlates of heavy metals, wherein coordinate bonds are formed between heavy metals and such chelating agents, include microbes of the *Bacillus* genus, such as *Bacillus editabidus, Bacillus subtilis* and *Bacillus megaterium, Bacillus sphaericus*. Examples of easily available strains of those microbes include *Bacillus edtabidus*-1 (FERM P-13449), *Bacillus subtilis* NRIC 0068, *B. megaterium* NRIC 1009 and *B. sphaericus* NRIC 1013.

Examples of other microorganisms having the ability to decompose EDTA include the strains of the *Pseudomonas* genus and the *Alcaligenes* genus disclosed in JP-A-53-43782, the strains of the *Aglobacterium* genus described in *Applied and Environmental Microbiology*, vol. 56, pp. 3346-3353 (1990), and Gram-negative isolate described in *Applied and Environmental Microbiology*, vol. 58, No. 2, pp. 671-676 (1992). *Pseudomonas editabidus* as an example of those strains is available as *Pseudomonas editabidus*-1 (FERM P-13634).

Examples of still other microorganisms having the ability to decompose EDTA include marine bacteria such as *Bacillus editabidus* and *Mesophilobacter editabidus*. This *Bacillus editabidus* as a bacterium capable of decomposing organic aminocarboxylic acids is the strain in which *Bacillus editabidus*-M1 (FERM P-14868) and *Bacillus editabidus*-M2 (FERM P-14869) are included. And *Mesophilobacter editabidus* as another bacterium capable of decomposing organic aminocarboxylic acids is the strain in which *Mesophilobacter editabidus*-M3 (FERM P-14870) is included.

Nutrients:

In the present mode of using microorganisms in a carried-and-immobilized state, it is appropriate that nutrients for the microorganisms be fed for the purpose of accelerating the growth of the microorganisms in a carried-and-immobilized state and rapidly securing an environment in which the microorganisms can thrive. In addition, it is preferable to feed nutrients when the activities of the microorganisms deteriorate during the operation of waste liquid treatment apparatus, thereby reactivating the microorganisms.

Examples of nutrients include substances containing carbon, nitrogen and phosphorus atoms, specifically culture solutions suitable for the growth of microorganisms. For instance, Culture solutions prepared by mixing meet juice, yeast extract, malt extract, bactopeptone, glucose, inorganic salts and minerals in appropriate proportions are often used. The mixing proportions can be chosen properly depending on the species of microorganisms used. In addition to these culture solutions, any other solutions can be used in the invention as far as they contain organic and inorganic nutrients in appropriate proportions. For instance, microorganisms randomly gathered from nature or further cultivated are dried, ground into fine powder and this powder may be used as a nutrient.

Additionally, specific symbiotic microorganisms capable of activating microorganisms acting as biodegradable bacteria can further be used. In some cases, such symbiotic microorganisms become by themselves a nutrient source of the microorganisms acting as biodegradable bacteria or, in other cases, materials secreted by symbiotic microorganisms contain components capable of activating the microorganisms acting as biodegradable bacteria. Examples of suitable microorganisms include microorganism mixtures commercially available as the so-called EM bacteria and photosynthesizing bacteria. Of these bacteria, photosynthesizing bacteria including Rhodepseudomonas capsulata and Thiobacilluse definitricans are preferred over the others.

Other Conditions for Preparation:

The microbial treatment requires its temperature to be suitable for activities of microorganisms, so the appropriate temperature thereof is from 3° C. to 50° C., preferably from 10° C. to 45° C., far preferably from 18° C. to 40° C. In order to keep such a temperature, warming by spray or injection of heated water may be performed according to the circumstances. In cold districts, on the other hand, a bioreactor may be heated by fitting thereto a thermal conductor and utilizing heat conduction from a heat source to the thermal conductor, or by passing electric current directly. The thermal conductor usable therein may be made of any material as far as it can conduct heat, with examples including metals and ceramics.

[Photographic Processing Solution]

The photographic processing waste liquid usable in the invention contains mainly ingredients of photographic processing solutions. In addition to these ingredients, it further contains reaction products formed in the process of photographic processing, inclusive of oxidation products of developing agents, sulfates and halides, and constituents eluted from photosensitive materials, inclusive a trace amount of gelatin, sensitizing dyes and surfactants.

The photographic processing solutions are used for processing color photographic materials and black-and-white photographic materials. Examples of color photographic materials processed with the photographic processing solutions include color paper, color reversal paper, taking color negative film, color reversal film, motion picture negative or positive film, and direct positive color photographic materials, and those of black-and-white photographic materials include X-ray film, photosensitive materials for graphic arts, micro films, and taking black-and-white film.

The photographic processing solutions include a color processing solution, a black-and-white processing solution, a reducing solution inherent in platemaking operations and development-processing tank cleaning solutions, and more specifically, they include a black-and-white developer, a color developer, a fixing solution, a bleaching solution, a bleach-fix solution and an image stabilizer.

In general the color developer contains as a main component an aromatic primary amine color-developing agent which is a p-phenylenediamine derivative in most cases. Typical examples of such a derivative include N,N-diethyl-p-phenylenediamine, 2-amino-5-diethylaminotoluene, 2-methyl-4-[N-ethyl-N-(β-hydroxyethyl)amino]aniline and N-ethyl-N-(β-methanesulfonamidoethyl)-3-methyl-4-amino-aniline. These p-phenylenediamine derivatives are present mainly in the form of sulfates, hydrochlorides, sulfites or p-toluenesulfonates. The content of such an aromatic primary amine developing agent is from about 0.5 g to about 10 g per liter of developer.

Examples of main ingredients the black-and-white developer can contain include 1-phenyl-3-pyrazolidone, 1-phenyl-4-hydroxymethyl-4-methyl-3-pyrazolidone, N-methyl-5-aminophenol and its sulfate, and hydroquinone and its sulfonate.

Examples of preservatives contained generally in the color and black-and-white developers include sodium sulfite, potassium sulfite, sodium hydrogen sulfite, potassium hydrogen sulfite, sodium metabisulfite, potassium metabisulfite and a carbonyl-sulfurous acid adduct. The content of such preservative is lower than 5 g per liter of developer.

The preservatives the color and black-and-white developers can further contain are various kinds of hydroxylamines. These hydroxylamines maybe substituted ones or unsubstituted ones. Examples of substituted hydroxylamines include those having lower alkyl groups on the nitrogen atoms thereof, notably those having two alkyl groups (e.g., containing 1 to 3 carbon atoms) on each of their nitrogen atoms, namely N,N-disubstituted dialkylhydroxylamines. These N,N-disubstituted dialkylhydroxylamines may also be used in combination with alkanolamines, such as triethanolamine. The content of hydroxylamines is from 0 to 5 g per liter of developer.

The color and black-and-white developers are adjusted to pH 9-12. For keeping the pH in such a range, various kinds of buffering agents are used. Examples of buffering agents usable for such a purpose include carbonates, phosphates, borates, tetraborates, hydroxybenzoates, glycine salts, N,N-dimethylglycine salts, leucine salts, norleucine salts, guanine salts, 3,4-dihydroxyphenylalanine salts, alanine salts, aminobutyrates, 2-amino-2-methyl-1,3-propanediol salts, valine salts, proline salts, trishydroxyaminomethane salts and lysine salts. Of these buffering agents, carbonates, tetraborates and hydroxybenzoates in particular are used to advantage, because they have high solubility, excellent buffer capacity in a high pH region of 9.0 or above and no adverse effect (e.g., fogging) on photographic properties when added to developers, and what is more, they are available at low prices. Therefore, these buffering agents are used in most cases. The total amount of those buffering agents added is generally from 0.1 to 1 mole per mole of developer.

To developers are further added a wide variety of chelating agents as preventives against precipitation of calcium and magnesium or for the purpose of increasing developer stability. Typical examples of such chelating agents include nitrilotriacetic acid, diethylenetriaminepentaacetic acid, nitrilo-N,N,N-trismethylenephosphonic acid, ethylenediamine-N,N,N',N'-tetramethylenephosphonic acid, 1,3-diamino-2-propanoltetraacetic acid, trans-cyclohexanediaminetetraacetic acid, 1,3-diaminopropanetetraacetic acid, 2-phosphonobutane-1,2,4-tricarboxylic acid, and 1-hydroxyethylidene-1,1-diphosphonic acid. These chelating agents may be used as combinations of two or more thereof, if needed.

The developers further contain various kinds of development accelerators. Examples of development accelerators usable therein include thioether compounds, p-phenylenediamine compounds, quaternary ammonium salts, p-aminophenols, amine compounds, polyalkylene oxides, 1-phenyl-3-pyrazolidones, hydrazines, meso-ion compounds, thion compounds and imidazoles.

Many of color developers for color paper contain alkylene glycols and benzyl alcohols in addition to the above-recited color developing agents, sulfites, hydroxylamine salts, carbonates and water softeners. On the other hand, these alcohols are not contained in developers for color negative, developers for color positive and some of developers for color paper.

Developers used in many cases contain bromide ions for prevention of fogging, but developers applied to silver chloride-dominated photosensitive materials are free of bromide ions in some cases. In addition, there are some cases wherein developers contain compounds providing chloride ions, such as NaCl and KCl, as inorganic antifoggants. Further, there are many cases in which various kinds of organic antifoggants are contained in developers. Examples of such organic antifoggants include adenines, benzimidazoles, benzotriazoles and tetrazoles. The content of these antifoggants is from 0.010 g to 2 g per liter of developer. In those antifoggants are also included those eluted from photosensitive materials and accumulated in a developer during the processing. In accordance with the invention, the waste liquid from a developer mixture having a total halide (including chloride and bromide ions as mentioned above) concentration of 1 millimole or higher per liter can be effectively treated. In particular, the invention is effective in treating the waste liquid from a developer mixture having a bromide concentration of 1 millimole or higher per liter.

Furthermore, various surfactants, such as alkylphosphonic acids, arylphosphonic acids, aliphatic carboxylic acids and aromatic carboxylic acids, are contained in developers.

In black-and-white photographic processing, fixation processing is carried out after development processing. In color photographic processing, on the other hand, bleach processing is generally carried out between development processing and fixation processing. However, the bleach processing may also be carried out simultaneously with the fixation treatment, namely in a mode of bleach-fix (blix) processing. Examples of an oxidizing agent contained in a bleaching solution include Fe(III) or Co(III) salts of EDTA, diethylenetriaminepentaacetic acid, nitrilotriacetic acid, 1,3-diamino-propanetetraacetic acid and phosphonocarboxylic acid, and further persulfates and quinones. In addition to such an oxidizing agent, the bleaching solution may contain proper amounts of re-halogenation agents, such as alkali bromides and ammonium bromide, borates, carbonates and nitrates. In general fixing and bleach-fix solutions contain thiosulfates (sodium and ammonium salts), acetates, borates, ammonium or potassium alum, and sulfites.

In the processing of silver halide photographic materials, wash and/or stabilization processing is generally carried out after fixation or bleach-fix processing. In the wash processing, there sometimes arises a problem that propagation of bacteria occurs in a washing tank and scum generated thereby adheres to photographic materials. As a solution to such a problem, the method disclosed in JP-A-61-131632, which enables reduction in calcium and magnesium ion concentrations, can be adopted. On the other hand, it is also possible to use bactericides, such as the isothiazolone compounds and thiabendazoles disclosed in JP-A-57-8542, chlorine-containing bactericides, such as sodium salt of chlorinated isocyanuric acid, benzotriazoles, and other bactericides as described in Hiroshi Horiguchi, *Bohkin Bohbai no Kagaku* (which means "Antibacterial and Mold-proof Chemistry"); *Biseibutsu no Mekkin Sakkin Bohbai Gijutsu* (which means "Arts of Sterilizing and Pasteurizing Microorganisms, and Proofing Against Molds"), compiled by Eisei Gijutsukai; and *Bohkin-Bohbaizai Jiten* (which means "Encyclopedia of Anti-bacteria and Anti-molds"), compiled by Nippon Bohkin Bohbai Gakkai.

EXAMPLES

The invention will now be illustrated in more detail by reference to the following examples. However, these examples should not be construed as limiting the scope of the invention in any way.

Example 1

One liter of color paper processing waste liquid, specifically waste liquid from CP-48S, discharged from Digital Minilab FRONTIER350 (made by Fuji Photo Film Co., Ltd.), which was adjusted in advance so as to have a COD/N ratio of 2.5 and an S content of 8 g/L, was poured into a 2-liter quartz cell for photochemical reaction. At the center of this quartz cell was set a 450 W high-pressure mercury lamp (Model UM-452 using UM-453BA as a ballast, made by USHIO INC.). The waste liquid in the quartz cell was treated for 12 hours by irradiation with ultraviolet light while aerating with ozone fed at a speed of 100 mg/hr from an ozone generator (FM-300N, made by Nikko Kinzoku) via a glass tube fitted with two ball filters (pore size grade 2G, 25 mm φ, made by Kinoshita Rika Kogyo) and inserted into the waste liquid from the top of the cell, wherein the total amount of ozone fed was adjusted to no lower than 0.5 equivalent of the waste liquid's COD. These operations were repeated to prepare a waste liquid sample for biological treatment.

A biological film peeled away from a submerged filter bed in a clarifying device installed in an aquarium for freshwater fish was inoculate into sludge, and the sludge was acclimated in a 5-liter treatment tank as the residence time thereof was in turn decreased to 20 days, 10 days, 5 days, 2 days and one day on a ten-day basis. While using the thus acclimated sludge, the foregoing waste liquid sample for biological treatment was subjected to continuous treatment in accordance with the activated-sludge process. During this treatment, phosphorus was added in the form of dipotassium hydrogen phosphate in an amount corresponding to 1% of the COD of the waste liquid, and calcium ion and magnesium ion were further added so as to have concentrations of 10 mg/L and 2 mg/L, respectively. The aeration tank was equipped with a pH controller (made by TOKYO RIKAKIKAI CO., LTD.), and the pH inside the tank was kept at 7.5±0.1 by addition of sulfuric acid or sodium hydroxide. Further, air was fed from an air compressor via the glass ball filter (made by Kinoshita Rika Kogyo) so that the quantity of dissolved oxygen (DO) was kept within the range of 0.1 mg/L to 3 mg/L. After one-month lapse from the start of operation under the residence time of one day, MLSS of the activated sludge was 41,000 mg/L. The activated sludge thus acclimated was encompassed and immobilized by alginic acid in the following manner.

(1) A 2% solution of sodium alginate (produced by Wako Pure Chemical Industries, Ltd.) was prepared in an amount of 500 ml. (2) The activated sludge acclimated in the foregoing manner was settled by using a centrifuge at 10,000 r.p.m. for 12 minutes to prepare wet sludge. A 250 g portion of the wet sludge was taken out, and thereto 250 ml of a 3% sodium chloride solution was added to prepare a suspension. (3) The sodium alginate solution (1) and the suspension (2) were mixed together and stirred until the mixture became homogeneous. (4) Ina 5-little plastic bucket, a 5% solution of potassium chloride (produced by Wako Pure Chemical Industries, Ltd.) was prepared in an amount of 4 liters. (5) The mixture (3) was added dropwise to the potassium chloride solution while stirring with a magnetic stirrer. (6) After conclusion of dropwise addition, the stirring was continued for 1 hour. The thus obtained admixture was allowed to stand for one night in a cool, dark place, and then washed thoroughly with a 3% solution of sodium chloride and ion exchange water while carrying out filtration.

The activated sludge encompassed and immobilized in the foregoing manner was packed into a glass column having an internal diameter of 50 mm and a length of 1,000 mm. And it was so devised that the waste liquid was injected into the column from below upward at the bottom of the column and the waste liquid flowing out of the top of the column was returned to the bottom of the column, thereby forming circulation of the waste liquid. The circulation was performed at a speed of 300 ml/hr by use of a Perista Pump (made by ATTO Corporation). Additionally, the same glass ball filter as mentioned above was inserted into the column and thereby aeration was carried out to keep an aerobic atmosphere.

A two-liter portion of the waste liquid sample for biological treatment was diluted by a factor of 2, further adjusted to pH 7.0, and then treated by use of the foregoing circulation system (Sample No. 1). The treated waste liquid was taken at the top of the column, and the CODMn thereof was determined in accordance with the manganese method defined by JIS (JIS K102: Testing Method of Industrial Effluent). In addition, the waste liquid prepared by precipitating sulfur through aging of the original waste liquid to decrease the S content to lower than 5 g/L (Sample No. 2, S content: 4.5 g/L), and a model waste liquid prepared by mixing a developer and a bleach-fix solution at a ratio of 4:1 and adjusting so as to have a COD/N ratio higher than 3 and an S content lower than 5 g/L (Sample No. 3, COD/N ratio: 3.2, S content: 4.2 g/L) were each subjected to the same treatment as Sample No. 1. The COD values after the three-day circulation are shown in Table 1.

TABLE 1

| No. | Testing Conditions | COD (mg/L) | Note |
|---|---|---|---|
| 1 | COD/N ratio ≦ 3, S content ≧ 5 g/L | 97 | Invention |
| 2 | COD/N ratio ≦ 3, S content < 5 g/L | 173 | Invention |
| 3 | COD/N ratio > 3, S content < 5 g/L | 790 | Comparison |

As shown in Table 1, the present COD/N ratio requirement of 3 or below (Sample No. 1 and Sample No. 2) enabled significant COD reduction to a sufficiently low level (below the allowable level of no higher than 250 mg/L). In particular, the present Sample No. 1 wherein the S content was adjusted to the range of 5 g/L to 20 g/L received a far more pronounced reduction in COD value than Sample No. 2, and the effect of S-content adjustment was recognized. On the other hand, Sample No. 3 having a COD/N ratio greater than 3 didn't received a COD reduction a low level.

Incidentally, in the experiment for Sample No. 3, the COD determined was the value shown in Table 1 (790 mg/L, or 1,580 mg/L in terms of undiluted waste liquid) when the waste liquid was diluted by a factor of 2 prior to biological treatment; while when the waste liquid was diluted by a factor of 5 the COD value was 150 mg/L, or 750 mg/L in terms of undiluted waste liquid. Therefore, these experimental results are just an indication that the embodiments of the invention are effective at reducing the factor of dilution prior to biological treatment. In the experiment for Sample No. 1, the COD value after the biological treatment was 210 mg/L when no dilution was performed prior to the biological treatment. This result shows that the dilution before biological treatment can be omitted according to embodiments of the invention.

Example 2

The same color paper processing waste liquid and the model waste liquid as used for the samples in Example 1 were each prepared in an amount of 12 liters, and subjected to 12-hour electrolytic treatment (5.2V, 650 A) by use of a liquid-waste electrolyzing apparatus BC-9 (made by JAPAN TECHNO CO., LTD.). The waste liquid after the electrolytic treatment was taken from the electrolytic cell of BC-9 and directly subjected to the same biological treatment as in Example 1. The results obtained are shown in Table 2.

TABLE 2

| No. | Testing Conditions | COD (mg/L) | Note |
|---|---|---|---|
| 1 | COD/N ratio ≦ 3, S content ≧ 5 g/L | 88 | Invention |
| 2 | COD/N ratio ≦ 3, S content < 5 g/L | 162 | Invention |

TABLE 2-continued

| No. | Testing Conditions | COD (mg/L) | Note |
|---|---|---|---|
| 3 | COD/N ratio > 3, S content < 5 g/L | 870 | Comparison |

The results shown in Table 2 demonstrate that, even when the ozone oxidation treatment was changed to the electrolytic oxidation treatment and the biological treatment was performed directly without any dilution after the electrolytic oxidation treatment, the COD value was able to be reduced to a sufficiently low level under the present condition that the COD/N ratio was adjusted to 3 or below (Sample No. 1 and Sample No. 2). Of the present samples, Sample No. 1 wherein the S content was adjusted to the range of 5 g/L to 20 g/L received a more remarkable reduction in COD value than Sample No. 2, and the effect of S-content adjustment was recognized.

In accordance with the present photographic waste liquid treatment method as above-mentioned characterized in that the photographic waste liquid adjusted to have a COD/N ratio of 3 or below is subjected to physicochemical oxidation treatment and then to biological treatment, BOD and COD can be reduced effectively even when the amount of water for dilution of photographic waste liquid before biological treatment is reduced. Specifically, the present method enables biodegradation treatment even under conditions that the dilution factor of waste liquid is lowered to 4 or below. Therefore, the present invention is practically applicable to photographic waste liquid treatment in photofinishing laboratories.

Example 3

<Photographic Waste Liquid Sample>

By use of Digital Minilab FRONTIER350 (made by Fuji Photo Film Co., Ltd.), printing from color negatives was done on commercial color paper (Fuji Color Paper Super) and the resultant color paper was subjected to photographic processing using CP-48S, the processing chemicals for Fuji Color Paper. The overflow solutions generated from the developing bath, the bleach-fix bath and the washing bath, respectively, in the photographic processing, namely development waste liquid, bleach-fix waste liquid and wash waste liquid, were mixed together, and used as photographic waste liquid for testing.

<Electrolytic Cell>

Figure 2:
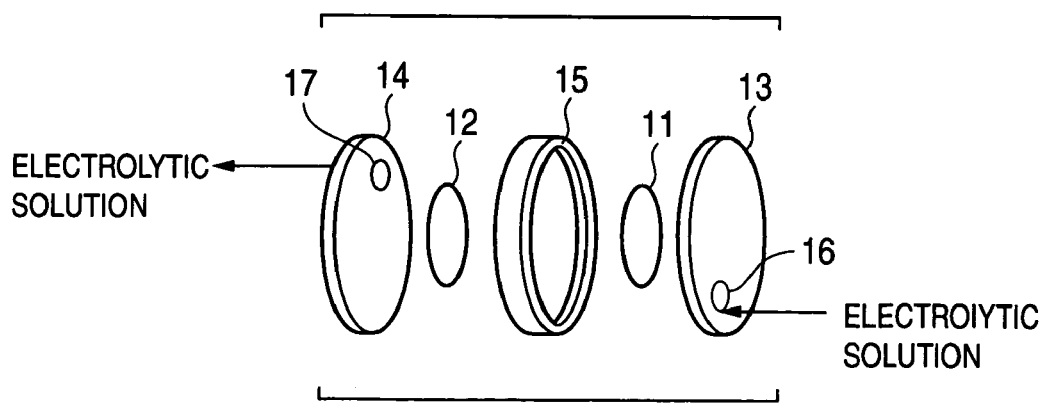
FIG. 2 is an illustration to show the structure of an electrolytic cell in an electrolytic oxidation apparatus used in the invention.

The electrolytic cell used in this example is shown in FIG. 2. As shown in FIG. 2, the electrolytic cell has a structure that a positive electrode 11 and a negative electrode 12 are placed on opposite sides of an annular spacer 15, with which a liquor layer is shaped and further sandwiched between two disk-form polyvinylidene chloride outer flames 13 and 14, and these members are bonded into a cell. The disk-form outer flames 13 and 14 have openings 16 and 17 for passage of liquor. The photographic waste liquid is introduced to the lower part of a positive electrode chamber via the opening 16, undergoes electrolytic oxidation, and sent out of the opening 17 in the upper part of the electrolytic cell.

More specifically, two electrodes are each bonded to a polyvinylidene chloride plate and placed on opposite sides of a 10 mm-thick polyvinylidene chloride spacer, and these plates are bonded to the spacer, thereby forming the electrolytic cell.

Each of positive and negative electrodes used was a boron-doped conductive diamond electrode having an electrode area of 15 cm², and it was made to the following specifications.

The boron-doped diamond layer electrode used was a boron-doped polycrystalline diamond layer (about 2.5 μm in thickness) formed by evaporating a thin diamond layer onto (100) monocrystalline silicon wafer (0.76 mm in thickness) according to the method mentioned hereinbefore and doping the diamond layer with boron, which is available from U.S. Advanced Technology Materials, Inc., 7 CommerceDrive, Daubury, Conn. 06810, U.S.A. The resistivity of this diamond layer was 80 MΩcm, and the doped boron concentration was 5,000 ppm. The resistivity of the silicon wafer was 15 MΩcm. A copper wire was fixed to the silicon substrate with commercially available silver epoxy (Epo-Tek H20E, a product of Epoxy Technology Inc.), leak of liquor to the side and rear of the electrode was minimized with RTV silicone, and the electrode was bonded to a polyvinylidene chloride plate so as to seal the boundary surface.

<Electrolysis>

A 1-liter portion of the photographic waste liquid was circulated via the electrolytic cell at a speed of 2 L/min, and the electrolysis of the waste liquid was performed at an electric current of 30 A for a time as set forth in Table 1 to 3. The electrolytic operations were carried out in two cases, a case where a filtering device equipped with a filter film for removal of precipitates was placed in the path of circulation and a case where no filtering device was placed.

FIG. 3 is a schematic diagram of the apparatus used for testing. A filtering device 26 for precipitate removal is placed between pipes 25 and 28 for circulating the waste liquid from the electrolytic cell 24 to the waste liquid tank 21. The waste liquid having passed through the filter film is sent out into the circulation pipe 28, while the filtration residue is recovered from the outlet 27.

The reaction solution after the electrolysis was adjusted to pH 6.5 with sodium hydroxide, and the precipitates generated, including silver sulfide and iron hydroxide, were removed by filtration. And TOC and EDTA contents in the filtrate were determined in accordance with the method defined in JIS (JIS K0102, Testing method of industrial effluent) and ion chromatography, respectively.

The results obtained are shown in Tables 3 and 4. Additionally, the TOC and EDTA concentration of the waste liquid sample before electrolysis were 12,300 ppm and 9,000 ppm, respectively.

TABLE 3

| | TOC | |
| --- | --- | --- |
| | TOC after 12-hour electrolysis | TOC after 24-hour electrolysis |
| Through no Filtration | 7,500 ppm | 3,500 ppm |
| Through Filtration | 2,500 ppm | 1,200 ppm |

As can be seen from Table 3, 90% or more of the organic component (component contributory to TOC) was oxidized in 24 hours by performing filtration of the electrolyzed solution during the electrolysis. And the TOC reduction rate achieved in the case of performing the filtration was more than twice as high as in the case of performing no filtration.

TABLE 4

| | EDTA | |
| --- | --- | --- |
| | EDTA after 12-hour electrolysis | EDTA after 24-hour electrolysis |
| Through no Filtration | 50 ppm | 20 ppm |
| Through Filtration | 20 ppm | not detected |

Although Table 4 indicates that about 95% decomposition of EDTA was achieved in 24 hours even when the filtration of the electrolyzed solution was not performed during the electrolysis, it is necessary to avoid EDTA from remaining after electrolysis and to decompose it completely because EDTA is resistant to biodegradation. In the case of performing the filtration, EDTA was decomposed and removed by 24-hour electrolysis to an undetected level. In other words, it was proved that electrolysis associated with filtration enables complete decomposition and removal of EDTA.

Example 4

The same testing as in Example 3 was carried out, except that the separation and removal operation of precipitates was changed from the filtration in Example 3 to an operation using sedimentation tanks.

Figure 4:
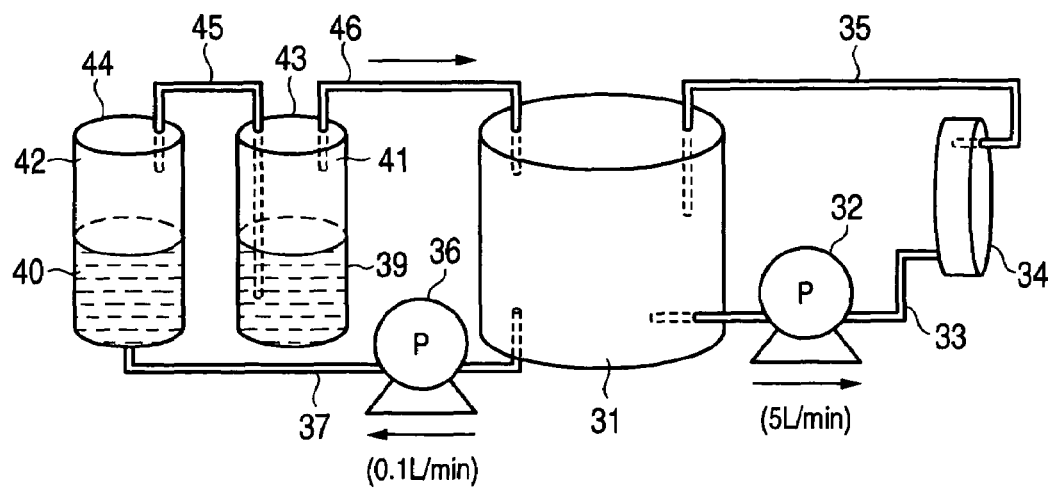
FIG. 4 is a schematic diagram showing another embodiment of the sedimentation tank-equipped electrolytic oxidation apparatus for photographic waste liquid, which is also used in Example.

FIG. 4 is a schematic diagram of the apparatus used for the testing. In the apparatus are present an electrolytic oxidation circulating system formed including a waste liquid tank 31 and an electrolytic cell 34 and a precipitate separation circulating system formed including the waste liquid tank 31 and sedimentation tanks 43 and 44. Reduction of TOC is proceeding as the spent solution, or waste liquid, in the waste liquid tank 31 undergoes a repeat of the forced circulation through both systems. The sedimentation is performed with sedimentation tanks 43 and 44 placed in series. The waste liquid is introduced into the sedimentation tank 44 through a feed pipe 37, the supernatant layer 42 in the tank 44 is fed to the tank 43 and receives sedimentation again. Further, the supernatant layer in the tank 43 is returned to the waste liquid tank 31 through a return pipe 46. Precipitates 39 and 40 are taken out from outlets not illustrated in FIG. 4 and used as a source for recovery of silver.

Circulation flow rates of the electrolytic oxidation circulating system and the sedimentation circulating system were controlled to 5 L/min and 0.1 L/min, respectively, as figured in FIG. 4.

Results of TOC measurement are shown in Table 5.

TABLE 5

| | TOC | |
| --- | --- | --- |
| | TOC after 12-hour electrolysis | TOC after 24-hour electrolysis |
| Without sedimentation tank | 7,500 ppm | 3,500 ppm |
| With sedimentation tanks | 4,500 ppm | 2,200 ppm |

The use of sedimentation tanks made it possible to achieve electrolysis efficiency of about 80% by 24-hour electrolysis and produced clear improvement effect, as in the case of adopting the filtration method.

Further, the silver content in the precipitates generated was determined by atomic absorption spectroscopy to be 0.85 g/g on a dry solids basis. These precipitates serve as a silver recovery source and can be consigned to persons involved in silver recovery. More specifically, this way of silver recovery enables the recovery in a concentrated state, compared with the way of solution recovery in which silver-containing waste liquid (including fixation waste liquid and fix-bleach waste liquid) is consigned to persons involved in silver recovery, and so the transport cost is reduced. Further, the precipitates can be thrown directly into a melting furnace, so the silver recovery operation can save one step.

According to the present method of treating photographic waste liquid by performing electrolytic oxidation while removing precipitates, as above-mentioned, the fouling of an electrolytic cell and the decrease in electrolysis efficiency with the lapse of time are prevented from occurring during the electrolysis, and the BOD and COD (or TOC) of photographic waste liquid can be reduced effectively with low power consumption to a level meeting the effluent standards of Sewerage Law. The present method is also practical in photofinishing laboratories.

Example 5

By use of Digital Minilab FRONTIER350 (made by Fuji Photo Film Co., Ltd.), printing from color negatives was done on commercial color paper (Fuji Color Paper Super) and the resultant color paper was subjected to photographic processing using CP-48S, the processing chemicals for Fuji Color Paper. The overflow solutions generated from the developing bath, the bleach-fix bath and the washing bath, respectively, in the photographic processing, namely development waste liquid, bleach-fix waste liquid and wash waste liquid, were mixed together, and used as photographic waste liquid for testing.

[0074]

<Electrolysis>

In a 15-liter tank provided with three negative electrodes (stainless, SUS 316) and two positive electrodes (lead dioxide, LD400, made by Japan Carlit Co., Ltd.) which were aligned alternately in parallel with one another, the waste liquid in an amount of 10 L was placed and electrolyzed. Under conditions that the area of each electrode was 200 cm$^2$, the distance between electrodes was 25 mm and the electric current was 100 A, electrolytic oxidation treatment of the waste liquid was carried out for 15 hours with stirring.

Then, other electrolysis experiments were carried out under the same conditions as above, except that the positive electrodes were each replaced by a platinum electrode having the same area and a diamond electrode having the same area, respectively.

The diamond electrodes were each a boron-doped diamond layer electrode, more specifically a boron-doped polycrystalline diamond layer (about 2.5 μm in thickness) formed by evaporating a thin diamond layer onto (100) monocrystalline silicon wafer (0.76 mm in thickness) according to the method mentioned hereinbefore and doping the diamond layer with boron, which is available from U.S. Advanced Technology Materials, Inc., 7 CommerceDrive, Daubury, Conn. 06810, U.S.A. The resistivity of this diamond layer was 80 MΩcm, and the doped boron concentration was 5,000 ppm. The resistivity of the silicon wafer was 15 MΩcm. A copper wire was fixed to the silicon substrate with commercially available silver epoxy (Epo-Tek H20E, a product of Epoxy Technology Inc.), leak of liquor to the rear of the electrode was minimized with RTV silicone, and the diamond electrodes were bonded, back to back, to seal the interface between them.

On the other hand, a commercially available platinum plate was used as the platinum electrode just the way it was.

As to the impressed voltage of each electrode, that of the lead dioxide electrode was 3.5V, that of the platinum electrode was 5V, and that of the diamond electrode was 6V.

The reaction solution after the electrolysis was adjusted to pH 6.5 with sodium hydroxide grains, and the precipitates generated, including silver sulfide and iron hydroxide, were removed by filtration. And COD and silver ion in the filtrate were determined by the manganese method defined in JIS (JIS K0102, Testing method of industrial effluent) and atomic absorptiometric analysis, respectively.

Further, the filtrate after the electrolysis was treated with activated sludge (MLSS(activated sludge suspension): 4,500 mg/l) at a residence time of 2 days under continuous aeration. While neutralizing the sulfuric acid generated therein with a 10% water solution of sodium hydroxide, the pH inside the aeration tank was kept at a value of no lower than 6.6.

The activated sludge used for the foregoing treatment was prepared by as follows: Sludge was gathered from the terminal waste-treatment site of Ashigara Factory of Fuji Photo Film Co., Ltd., and mixed with a nutritious solution mentioned hereinbefore as a nutrient source for microorganisms and the foregoing waste liquid sample solution. This mixture was placed in an aeration tank provided with a pH controller (made by TOKYO RIKAKIKAI CO., LTD.), and air was fed into the tank so that the quantity of dissolved oxygen (DO) was kept within the range of 0.1 mg/L to 3 mg/L. And the sludge was acclimated while keeping the pH inside the tank at 8.5±0.1 by addition of sulfuric acid or sodium hydroxide.

The mixing ratio between the nutritious solution and the photographic waste liquid was 9:1 at the start of acclimation, and the proportion of the photographic waste liquid was increased gradually while checking the stage of the sludge. These operations were continued for 3 weeks. The thus treated liquor in its entirety was taken as a photographic waste liquid sample.

The COD of the thus treated photographic waste liquid sample was analyzed (the permanganic acid method mentioned above).

TABLE 5

| Treatment Process | | | Residual COD | Power consumption |
|---|---|---|---|---|
| | Original waste liquid | | 21,500 mg/L | — |
| Electrolysis | Lead dioxide | 15 hrs. | 13,800 mg/L | 0.525 kwh/L |
| | | 30 hrs. | 8,100 mg/L | 1.050 kwh/L |
| | Platinum | 15 hrs. | 16,200 mg/L | 0.750 kwh/L |
| | | 30 hrs. | 10,500 mg/L | 1.500 kwh/L |

TABLE 5-continued

| Treatment Process | | | | Residual COD | Power consumption |
|---|---|---|---|---|---|
| | Diamond | 15 hrs. | | 5,250 mg/L | 0.900 kwh/L |
| | | 30 hrs. | | 480 mg/L | 1.800 kwh/L |
| Electrolysis + Biological treatment | Lead dioxide | 15 hrs. | 3-day activated sludge treatment | 10,500 mg/L | 0.561 kwh/L |
| | Platinum | 15 hrs. | 3-day activated sludge treatment | 12,900 mg/L | 0.786 kwh/L |
| | Diamond | 15 hrs. | 3-day activated sludge treatment | 170 mg/L | 0.936 kwh/L |

As can be seen from Table 5, a 99% or greater reduction in the residual COD was achieved in the case where the COD of the waste liquid was reduced to one-half or less its original value by the electrolytic oxidation treatment with the diamond electrodes and then the biological treatment was carried out, and what is more, the electric power required for this reduction was about one-half the electric power required in the case where the residual COD reduction rate approaching 99% was attained by the electrolysis alone. In other words, it is safely said that the present experiments of Example 5, and subjected to the same biodegradation treatment as in Example 5. Therein, the electrolyzed quantity enabling the present electrolysis-biodegradation combination to produce appreciable effect was determined from electrode to electrode. The thus obtained relations among the electrolysis time, the progressive of COD reduction over electrolysis time and the amount of electrical power required are shown in Table 7.

TABLE 7

| | Operation voltage (V) | Electrolysis time (hour) | COD after electrolysis (mg/L) | COD reduction rate (%) by electrolysis | COD (mg/L) after 3-day activated sludge treatment subsequent to electrolysis | Total electrical power (kwh/L) required by reduction of COD to lower than 600 ppm |
|---|---|---|---|---|---|---|
| Lead dioxide electrodes + Biological treatment | 3.5 | 15 | 12,810 | 36 | 10,500 | |
| | 3.5 | 30 | 8,100 | 62 | 4,200 | |
| | 3.5 | 45 | 3,800 | 82 | 570 | 1.73 |
| | 3.5 | 52 | 1,900 | 91 | 240 | 1.97 |
| | 3.5 | 60 | 570 | 97 | 10 | 2.25 |
| Platinum electrodes + Biological treatment | 5 | 15 | 16,200 | 25 | 12,900 | |
| | 5 | 30 | 10,500 | 51 | 7,100 | |
| | 5 | 45 | 5,250 | 76 | 1,700 | |
| | 5 | 52 | 3,350 | 84 | 310 | 2.75 |
| | 5 | 60 | 1,100 | 95 | 20 | 3.15 |
| Diamond electrodes + Biological treatment | 6 | 8 | 11,200 | 48 | 3,800 | |
| | 6 | 10 | 8,600 | 60 | 16,00 | |
| | 6 | 13 | 6,450 | 70 | 590 | 0.93 |
| | 6 | 15 | 5,250 | 76 | 170 | 1.05 |
| | 6 | 30 | 480 | 98 | 10 | 1.95 | combination of treatments is a highly efficient treatment method. Additionally, Table 1 shows that when biodegradation treatment was carried out after the electrolysis with electrodes other than the diamond electrodes the biodegradation treatment failed to provide a significant reduction in residual COD because of incomplete removal of hard-to-biodegrade compounds resulting from insufficient electrolysis. In this respect also, the effectiveness of the invention is apparent.

Example 6

Waste liquid samples were taken out in specified portions at close time intervals from the waste liquid undergoing the electrolysis in progress under the same conditions as in the In the case of the present method where the electrolysis with diamond electrodes and the biological treatment were combined, the COD of waste liquid was reduced to below the COD standard of Sewerage Law, that is, below 600 mg/L, in the biological treatment subsequent to the electrolysis as far as at least 70% reduction in COD was achieved in the electrolysis process. In the cases of using the other electrodes, on the other hand, the COD of waste liquid was not reached to below 600 mg/L so far as the reduction rate of COD in the electrolysis was smaller than 80%. Moreover, the power consumption required for achieving COD lower than 600 mg/L in the cases of using the other electrodes was more than twice that required in the case of using diamond electrodes. Therefore, the effectiveness of the present method is apparent.

When the diamond electrodes are used, the production of easily biodegradable components, notably formic acid and acetic acid, from organic ingredients in waste liquid through electrolytic oxidation progresses rapidly. It is therefore supposed that biodegradation takes place with ease even under high COD values.

In accordance with the present method of treating photographic waste liquid, as above-mentioned, wherein the biological treatment is carried out after the electrolytic oxidation treatment using conductive diamond electrodes as positive electrodes, both BOD and COD of photographic waste liquid can be reduced efficiently to a level meeting the effluent standards of Sewerage Law. The present method can be used practically in photofinishing laboratories also.

This application is based on Japanese patent applications JP 2003-138922, filed on May 16, 2003, JP 2003-146430, filed on May 23, 2003, and JP 2003-146431, filed on May 23, 2003, the entire content of which is hereby incorporated by reference, the same as if set forth at length.

What is claimed is:

1. A method of treating photographic waste liquid, comprising:
    adjusting photographic waste liquid so as to have a COD/ammoniacal nitrogen ratio of 3 or below; performing a physicochemical oxidation treatment to the adjusted photographic waste liquid; and then performing a biological treatment to the treated photographic waste liquid, wherein the physicochemical oxidation treatment of the photographic waste liquid is an electrolytic oxidation treatment.

2. The method of treating photographic waste liquid as described in claim 1, wherein the photographic waste liquid having been subjected to the physicochemical oxidation treatment is subjected to the biological treatment directly or in a state of water dilution having a dilution factor of 1 to 4, wherein the dilution factor is defined as a ratio of (volume of waste liquid after dilution with water) to (volume of undiluted waste liquid).

3. The method of treating photographic waste liquid as described in claim 1, wherein the photographic waste liquid is further adjusted so as to have a sulfur content of 5 g/L to 20 g/L.

4. The method of treating photographic waste liquid as described in claim 1, wherein the biological treatment is an activated-sludge treatment.

5. The method of treating photographic waste liquid as described in claim 1, wherein the biological treatment is a treatment with microorganisms immobilized in a carrier.

6. The method of treating photographic waste liquid as described in claim 1, wherein the photographic waste liquid is color photographic waste liquid.

7. The method of treating photographic waste liquid as described in claim 1, wherein the photographic waste liquid contains a hardly biodegradable compound.

* * * * *